US012769633B2

(12) United States Patent
Arunachalam

(10) Patent No.: US 12,769,633 B2
(45) Date of Patent: Oct. 20, 2026

(54) INTEGRATED FAILURE PREDICTION WITH SYSTEM MODELING

(71) Applicant: HEWLETT PACKARD ENTERPRISE DEVELOPMENT LP, Spring, TX (US)

(72) Inventor: Somasundaram Arunachalam, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 23 days.

(21) Appl. No.: 19/025,529

(22) Filed: Jan. 16, 2025

(65) Prior Publication Data

US 2026/0119358 A1 Apr. 30, 2026

(30) Foreign Application Priority Data

Oct. 29, 2024 (IN) ............................ 202441082710

(51) Int. Cl.
*G06F 11/00* (2006.01)
*G06F 11/30* (2006.01)

(52) U.S. Cl.
CPC ...... *G06F 11/3072* (2013.01); *G06F 11/3058* (2013.01); *G06F 2201/86* (2013.01)

(58) Field of Classification Search
CPC ............. G06F 11/3072; G06F 11/3058; G06F 2201/86
USPC ........................................................ 714/1–57
See application file for complete search history.

(56) References Cited

U.S. PATENT DOCUMENTS 8,677,157 B1 * 3/2014 Sevtsenko ........... G06F 11/3457 713/300
11,934,840 B2 3/2024 Arunachalam et al.
12,026,091 B2 7/2024 Arunachalam
2008/0104452 A1 * 5/2008 Archer ................ G06F 11/3447 726/1
2019/0245766 A1 * 8/2019 Onoue .................... H04L 47/20
2020/0081513 A1 * 3/2020 Lee .......................... G05F 1/66
2021/0232479 A1 * 7/2021 Sprague .............. G06F 11/3442
(Continued)

OTHER PUBLICATIONS

CS.CMU.EDU, "kd-Trees," CMSC 420, retrieved online Jan. 7, 2025, https://www.cs.cmu.edu/~ckingsf/bioinfo-lectures/kdtrees.pdf, 29 pages.

(Continued)

*Primary Examiner* — Sarai E Butler
(74) *Attorney, Agent, or Firm* — Dickinson Wright

(57) ABSTRACT

Systems and methods are provided for generating adaptive modeling and failure prediction of devices in the data center. For example, the system may determine a consumption ratio of operations that are conducted by the device and generate a consumption variance tree data structure using the determined consumption ratio. Once the consumption variance tree data structure is generated, it is provided as input for training a system characterization machine learning model or functional characterization machine learning model. Either of the models may be trained to detect operational events prior to a failure event of the device in the data center. Using the trained machine learning model, the system may implement an inference process and, in turn, generate adaptive modeling and failure prediction of other devices in the data center using the trained machine learning model.

20 Claims, 14 Drawing Sheets

(56) References Cited

U.S. PATENT DOCUMENTS

2025/0156253 A1* 5/2025 Sun ........................ G06F 11/004
2025/0335275 A1* 10/2025 Ottar .................... G06F 11/3452

OTHER PUBLICATIONS geeksforgeeks.com, “Clustering in Machine Learning,”, available online at <https://www.geeksforgeeks.org/clustering-in-machine-learning/>, Mar. 20, 2024, 17 pages.

Google, “Introduction to Clustering,”, available online at <https://developers.google.com/machine-learning/clustering/.>, Sep. 18, 2024, 2 pages.

Hewlett Packard Enterprise, “Hewlett Packard Enterprise Delivers Second Exascale Supercomputer, Aurora, to U.S. Department of Energy’s Argonne National Laboratory,” May 13, 2024, 9 pages.

Hewlett Packard Enterprise, “Hewlett Packard Enterprise Ushers in New Era with World’s First and Fastest Exascale Supercomputer “Frontier” for the U.S. Department of Energy’s Oak Ridge National Laboratory,” May 30, 2022, 13 pages.

Hewlett Packard Enterprise, “HPE and AMD Power Complex Scientific Discovery in World’s Fastest Supercomputer for U.S. Department of Energy’s (DOE) National Nuclear Security Administration (NNSA),” Mar. 4, 2020, 13 pages.

Hewlett Packard Enterprise, “HPE Superdome Flex, Superdome Flex: The Ultimate x86 Based Mission-critical Platform,” available online at <https://www.hpe.com/psnow/doc/a00026242enw?jumpid=in_lit-psnow-red>, Dec. 2, 2024, QuickSpecs, 39 pages.

Hewlett Packard Enterprise, “Integrating Superdome Flex into your HPC Cluster Just Got Easier,” available online at <https://community.hpe.com/t5/servers-systems-the-right/integrating-superdome-flex-into-your-hpc-cluster-just-got-easier/ba-p/7176222>, Oct. 20, 2022, 5 pages.

Kaushik, S., “Introduction to Feature Selection Methods with an Example,”, available online at <https://www.analyticsvidhya.com/blog/2016/12/introduction-to-feature-selection-methods-with-an-example-or-how-to-select-the-right-variables/>, Apr. 30, 2024, 19 pages.

mjmwired.net, “Linux Kernel Documentation on ABI Testing, sysfs-memory-page-offline,” available online at <https://mjmwired.net/kernel/Documentation/ABI/testing/sysfs-memory-page-offline#>, Sep. 2009, 9 pages.

OpenZFS, “Checksums and Their Use in ZFS,”, available online at <https://openzfs.github.io/openzfs-docs/Basic%20Concepts/Checksums.html.>, 2023, 2 pages.

Qiu et al., “A survey of machine learning for big data processing”, EURASIP Journal on Advances in Signal Processing, 2016, 16 pages.

Sait et al., “Design Partitioning and Layer Assignment for 3D Integrated Circuits Using Tabu Search and Simulated Annealing,” 2016, Journal of Applied Research and Technology, 10 pages.

Shanthamallu et al., “A Brief Survey of Machine Learning Methods and their Sensor and IoT Applications”, 2017, 8 pages.

Techsimplifiedtv.In, “What is Partitioning in Physical Design?”, available online at <https://www.techsimplifiedtv.in/2024/08/what-is-partitioning-in-physical-design.html#google_vignette>, Aug. 3, 2024, VLSI Physical Design, 11 pages.

Wheeless, B., “A Look Into K-Dimentional Trees,”, available online at <https://medium.com/smucs/a-look-into-k-dimensional-trees-290ec69dffe9>, Apr. 5, 2021, 18 pages.

Wikipedia, “Frontier (Supercomputer),”, available online at <https://en.wikipedia.org/wiki/Frontier_(supercomputer)>, Nov. 22, 2024, 4 pages.

* cited by examiner

500

| Compute Operations (510) | Memory Operations (520) | IO Operations (530) | Failure events (540) | Internal/External Environmental Aspects, ratios of power consumptions of DIMM (550) | Time (560) |
|---|---|---|---|---|---|
| 6 | 5 | 2 | | Active standby:other power states | 1st Month |
| 1 | 8 | 9 | Corrected Failure(s) | Internal Fan Failures<br>Active standby:other power states | 2nd Month |
| 7 | 1 | 1 | | Active standby:other power states | 3rd Month |
| 7 | 8 | 7 | | Active standby:other power states | 4th Month |
| 7 | 3 | 6 | Corrected failure(s)Permanent Failure | Temperature Overshoot in the physical area of the system entity<br>Active standby:other power states | 5th Month |
| 2 | 1 | 4 | | Active standby:other power states | 6th Month |
| 1 | 4 | 1 | | Active standby:other power states | 7th Month |
| 8 | 7 | 3 | | Active standby:other power states | 8th Month |
| 6 | 2 | 8 | Corrected Failure(s) | Power loss issues,Active standby:other power states | 9th Month |
| 2 | 8 | 6 | Permanent Failure | Active standby:other power states | 10th Month |
| 9 | 1 | 4 | Corrected Failure(s) | Active standby:other power states | 11th Month |
| 2 | 8 | 3 | | Active standby:other power states | 12th Month |
| 8 | 1 | 4 | | Active standby:other power states | 13th Month |
| 9 | 4 | 1 | | Active standby:other power states | 15th Month |
| 7 | 2 | 9 | | Active standby:other power states | 16th Month |

FIG. 5

INTEGRATED FAILURE PREDICTION WITH SYSTEM MODELING

BACKGROUND

Data centers comprise servers, storage, switches, edge devices, and other devices. The system configurations for each of these devices can be unique, even when the devices share the same processor, memory and input/output (I/O). For example, the unique devices can share peripherals or execute add-on functionalities (e.g., IEEE 802.11 WIFI, aggregated components like a group of server blades, or chassis that are different in microelectronic levels). With each of these different devices in the data center, multiple methods are used to individually track the operability and efficiency of these devices to help avoid device failures.

This compute environment in a data center also comprises of specialized high performance compute ecosystems like specialized heterogeneous HPC® clusters, supercomputers that can perform exascale computations with diverse and large sets of specialized hardware like processors, microcontrollers, accelerators, GPUs, accelerated processing units (APUs), smart NICs, memory fabric, NUMAlink®, and so on.

BRIEF DESCRIPTION OF THE DRAWINGS

The present disclosure, in accordance with one or more various examples, is described in detail with reference to the following figures. The figures are provided for purposes of illustration only and merely depict typical, non-limiting aspects of such examples.

FIG. 5 illustrates a data store for a consumption ratio, in accordance with some examples described herein.

Figure 1:
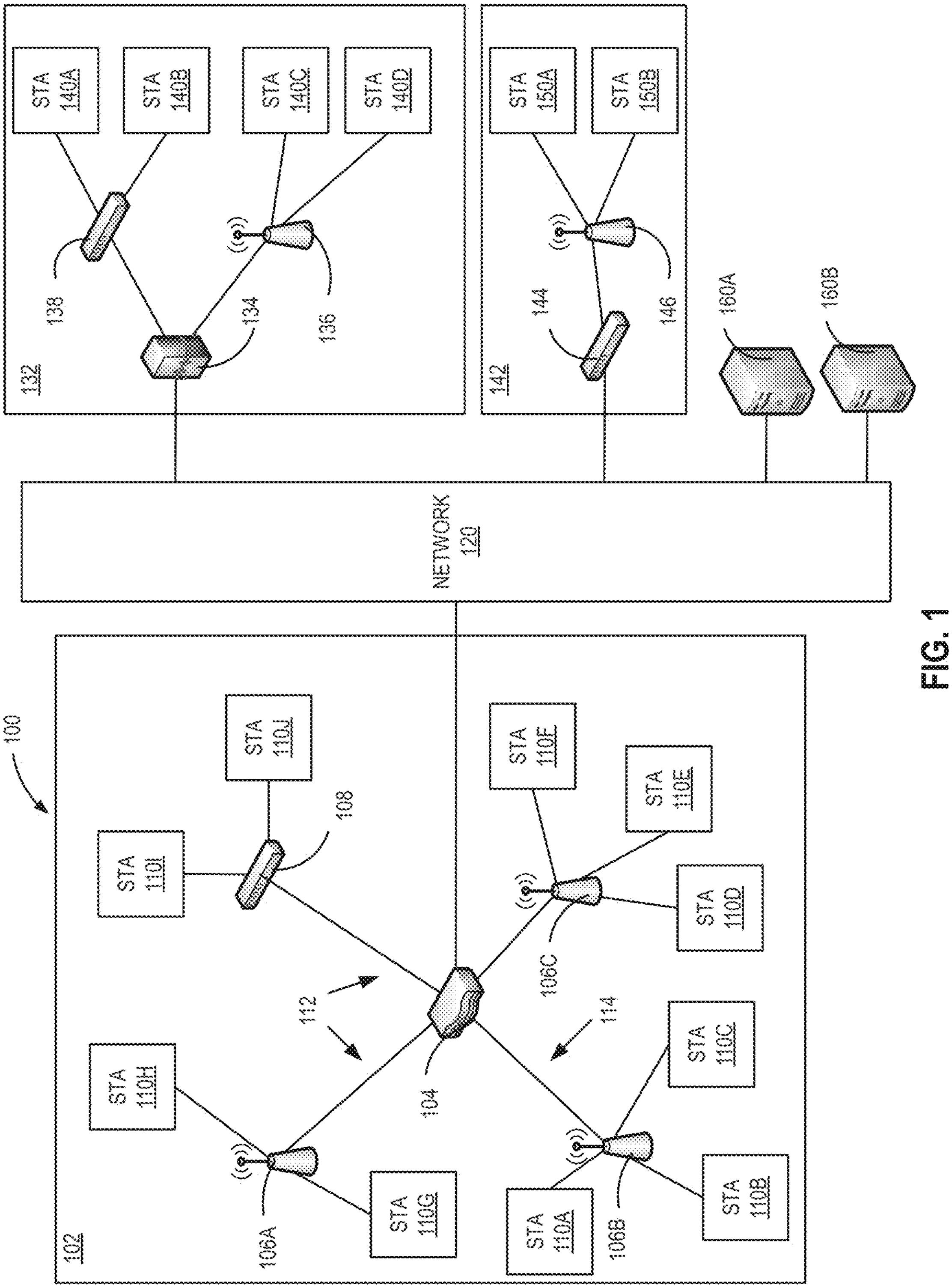
FIG. 1 illustrates one example of a network configuration that may be implemented for an organization, such as a business, educational institution, governmental entity, healthcare facility, or other organization, in accordance with some examples of the disclosure.

The figures are not exhaustive and do not limit the present disclosure to the precise form disclosed.

DETAILED DESCRIPTION

In some examples, a data center may implement heterogeneous compute environments in an aggregated unit form. Examples of these heterogeneous compute environments include a chassis with four sockets where two sockets contain Intel® scalable processors and two sockets contain AMD® or ARM® processors. The heterogeneous compute environment can access the chassis as its aggregated unit. Such environments may consist of scale up as well as scale out compute clusters as present in supercomputers and high performance computing clusters.

Modeling these heterogeneous compute environments can help identify the source of any compute issues. For example, the system may be modeled by identifying a consumption ratio of the compute/processor operations, memory operations, and I/O operations for each component (e.g., compute: memory:I/O). When addressing failures throughout the data center, including failures of a dual in-line memory module (DIMM), processor failures, and I/O card errors, enclosure/cabinet sensors errors, the components like left and right expanders may be used to implement expansive high performance compute node inter-connections in the supercomputing cabinet. The supercomputing cabinet may also include innumerable and diverse system components, like specialized FPGAs, signaling elements, hard real-time miniature entities, or liquid cooling system controllers (e.g., that are responsible for compatible run time operations of heterogenous compute, memory, and I/O devices). The system may determine the occurrence of the failure with the component's usage pattern.

Predictive modeling of system behavior that is integrated with predictive modeling of the failure of components can help improve the processing and other operations of the data center overall. These architectures may run a next-generation research class workload, like scientific computing software models, simulations, or scientific workflows that are multidisciplinary. In these types of architectures, they can run a powerful and heterogeneous mix of scale-up/scale-out architectures. This modeling may be profound for efficient and continued operations. In some examples, the device that is modeled is a supercomputer or exascale supercomputer (e.g., Hewlett Packard Enterprise® Frontier®, or OLCF-5®) or mission critical servers like HPE® Superdome Flex® scale-up severs.

Examples of the system improve system functionality through various methods. For example, the system can receive operations data of a device in a data center related to processor compute operations, memory operations, and I/O operations of the device. The system can determine a consumption ratio of the operations conducted by the device (e.g., data over a period of one year or more, which may be run with complex scientific simulations, scientific computing involving genome sequencing, models related to oceanic floor characteristics to gain insights about the tectonic plates, its micro and macro functional attributes, etc.). These operations, for example, involve high intensity operations that are computationally load heavy, memory centric at several instants, and execute I/O operations that may utilize system resources intensively at different times of the model's functional state. The I/O operations may be intensive and targeted towards network I/O or storage I/O. The operations may execute sequentially or in a massively parallel way. The system or prediction model may generate a consumption variance tree data structure using the consumption ratio of operations conducted by the device (e.g., associated with the processor compute operations, the memory operations, and/or the I/O operations). The consumption variance tree may be based on analyzing the assembly instruction dumps (e.g., in out-of-bands, or absent involving processor cores of the system being modeled). The system being modeled may not perform the modeling, leaving the system to execute critical and elaborative operations (e.g., scientific computing, sampling radio astronomical data, or other operations per second).

The consumption variance tree data structure may record a pattern of the consumption ratio or other proportion of operations over a time range and a failure event of the device. Once the consumption variance tree data structure is generated, it is provided as input for training a ML model, that may be called as "system characterization machine learning (ML) model." The system characterization ML model may be trained to detect operational events prior to a failure event of the device in the data center. The failure event may be defined as a transient or progressive permanent failure indicating cautions/alerts of specific components and adverse/component health degrading surprise environmental factors. Using the trained system characterization ML model, the system may implement an inference process that produces output from the trained system characterization ML model. The system may, in turn, generate adaptive modeling and failure prediction of other devices in the data center using the trained system characterization ML model.

In some examples, the system may comprise an ensemble of methods arranged in sequential-parallel mixed patterns or a focal point-based or star topology-based arrangement with node augmented k-d tree at the center.

Technical improvements are realized throughout the disclosure. For example, the system can improve the training process of machine learning model by providing the consumption variance tree data structure as input. The use of the consumption variance tree data structure may help identify the operational similarities or functional characteristics in devices to help prevent system failures throughout the data center, thus improving the technology in the data center. The system can also expedite the training and pattern detection performed by the model, thus improving the model training process.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. FIG. 1 illustrates an example of a configuration implemented with an organization having multiple users (or at least multiple client devices 110) and possibly multiple physical or geographical sites 102, 132, and 142. The network configuration 100 may include a primary site 102 in communication with a network 120. The network configuration 100 may also include one or more remote sites 132, 142, that are in communication with the network 120.

Any of the compute nodes may be identified to determine operations data for network configuration 100. For example, any of the devices located at physical or geographical sites 102, 132, and 142, including devices that are in communication with network 120. The operations data may comprise operations executed by devices that are unique, even when the devices share the same processor, memory and I/O. For example, the operations data may include, but is not limited to, a measure or estimate of read, write, access, or other data flow characteristics, such as but not limited to, jitter, delay, airtime, latency, etc.; analytics; transmission protocols (e.g., OFDMA and MU-MIMO), and the like. The operations data may be stored in a database that is cloud-based, which would be understood by those of ordinary skill in the art to refer to being, e.g., remotely hosted on a system/servers in a network (rather than being hosted on local servers/computers) and remotely accessible.

In some examples, network configuration 100 comprises memory-oriented distributed computing based connected fabric. The device may be implemented to hold an instruction dump. Network configuration 100 may also comprise ambient networks with heterogeneous link-phy bridges (e.g., WIFI, ultrawideband (UWB), inifiniband, fiber optics, and Ethernet).

In some examples, network configuration 100 includes a data center. The data center may be extremely sophisticated with a large supercomputer and innumerable hardware subsystems. In some examples, the data center may include IOT or edge devices. The edge devices may be diverse edge devices. The clustering may identify every compute device in the data center, including specialized compute devices, custom compute devices, compute embedded functional devices like storage controllers, smart NICs, system on a programmable chip (SOPC), several subsystems, indigenous compute devices in a robotic system, like vision, navigation, cognitive systems, and other devices.

The primary site 102 may include a primary network, which may be an office network, home network, or other network installation, for example. The primary network may be a private network, such as a network that may include security and access controls to restrict access to authorized users of the private network. Authorized users may include employees of a company at primary site 102, residents of a house, customers at a business, for example.

In the example of FIG. 1, the primary site 102 includes a controller 104, which is in communication with the network 120. The controller 104 may provide communication with the network 120 for the primary site 102. There may be other points of communication with the network 120 for the primary site 102 in addition to controller 104. Although single controller 104 is illustrated, the primary site 102 may include multiple controllers and/or multiple communication points with network 120. In some embodiments, the controller 104 may communicate with the network 120 through a router. In other embodiments, the controller 104 provides router functionality to the devices in the primary site 102. In this specification, the word "tunnel" refers to an encapsulated mode of transporting data between AP and controller.

The controller 104 may be operable to configure and manage network devices, such as at the primary site 102, and may also manage network devices at the remote sites 132, 142. The controller 104 may be operable to configure and/or manage switches, routers, access points, and/or client devices connected to a network. The controller 104 may itself be, or provide the functionality of, an Access Point (AP).

The controller 104 may be in communication with one or more switches 108 and/or wireless Access Points (APs) 106*a-c*. Switches 108 and wireless APs 106*a-c* provide network connectivity to various client devices 110*a-j*. Using a connection to a switch 108 or AP 106*a-c*, a client device 110*a-j* may access network resources, including other devices on the (primary site 102) network and the network 120.

Examples of client devices may include: desktop computers, laptop computers, servers, web servers, authentication servers, authentication-authorization-accounting (AAA) servers, domain name system (DNS) servers, dynamic host configuration protocol (DHCP) servers, internet protocol (IP) servers, virtual private network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, internet of things (IOT) devices, and the like.

Within the primary site 102, a switch 108 is included as one example of a point of access to the network established in primary site 102 for wired client devices 110*i-j*. Client devices 110*i-j* may connect to the switch 108 and through the switch 108, may be able to access other devices within the network configuration 100. The client devices 110*i-j* may also be able to access the network 120, through the switch 108. The client devices 110*i-j* may communicate with the switch 108 over a wired or wireless connection 112. In the illustrated example, the switch 108 communicates with the controller 104 over a wired or wireless connection 112.

Wireless APs 106*a-c* are included as another example of a point of access to the network established in primary site 102 for client devices 110*a-h*. Each of APs 106*a-c* may be a combination of hardware, software, and/or firmware that is configured to provide wireless network connectivity to wireless client devices 110*a-h*. In the example of FIG. 1, APs 106*a-c* can be managed and configured by the controller 104. APs 106*a-c* communicate with the controller 104 and the network over connections 112, which may be either wired or wireless interfaces.

Network configuration 100 may include one or more remote sites 132. Remote site 132 may be located in a different physical or geographical location from primary site 102. In some cases, remote site 132 may be in the same geographical location, or possibly the same building, as primary site 102, but lacks a direct connection to the network located within primary site 102. Instead, remote site 132 may utilize a connection over a different network, e.g., network 120. Remote site 132 such as the one illustrated in FIG. 1 may be a satellite office, another floor or suite in a building, for example. Remote site 132 may include gateway device 134 for communicating with the network 120. A gateway device 134 may be a router, a digital-to-analog modem, a cable modem, a digital subscriber line (DSL) modem, or some other network device configured to communicate with the network 120. The remote site 132 may also include a switch 138 and/or AP 136 in communication with the gateway device 134 over either wired or wireless connections. The switch 138 and AP 136 provide connectivity to the network for various client devices 140*a-d*.

In various embodiments, the remote site 132 may be in direct communication with primary site 102, such that client devices 140*a-d* at the remote site 132 access the network resources at the primary site 102 as if these client devices 140*a-d* were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150*a-b* access the network 120. Such a remote site 142 may represent, for example, an individual employee's home or a temporary remote office. The remote site 142 may also be in communication with the primary site 102, such that the client devices 150*a-b* at the remote site 142 access network resources at the primary site 102 as if these client devices 150*a-b* were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160*a-b*. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various servers 160*a-b*. In an example, servers 160*a-b* may comprise content servers that include various providers of multimedia downloadable and/or streaming content, including audio, video, graphical, and/or text content, or any combination thereof. Examples of content servers 160*a-b* include web servers, streaming radio and video providers, and cable and satellite television providers. The client devices 110*a-j*, 140*a-d*, 150*a-b* may request and access the multimedia content provided by the content servers 160*a-b*.

Figure 2:
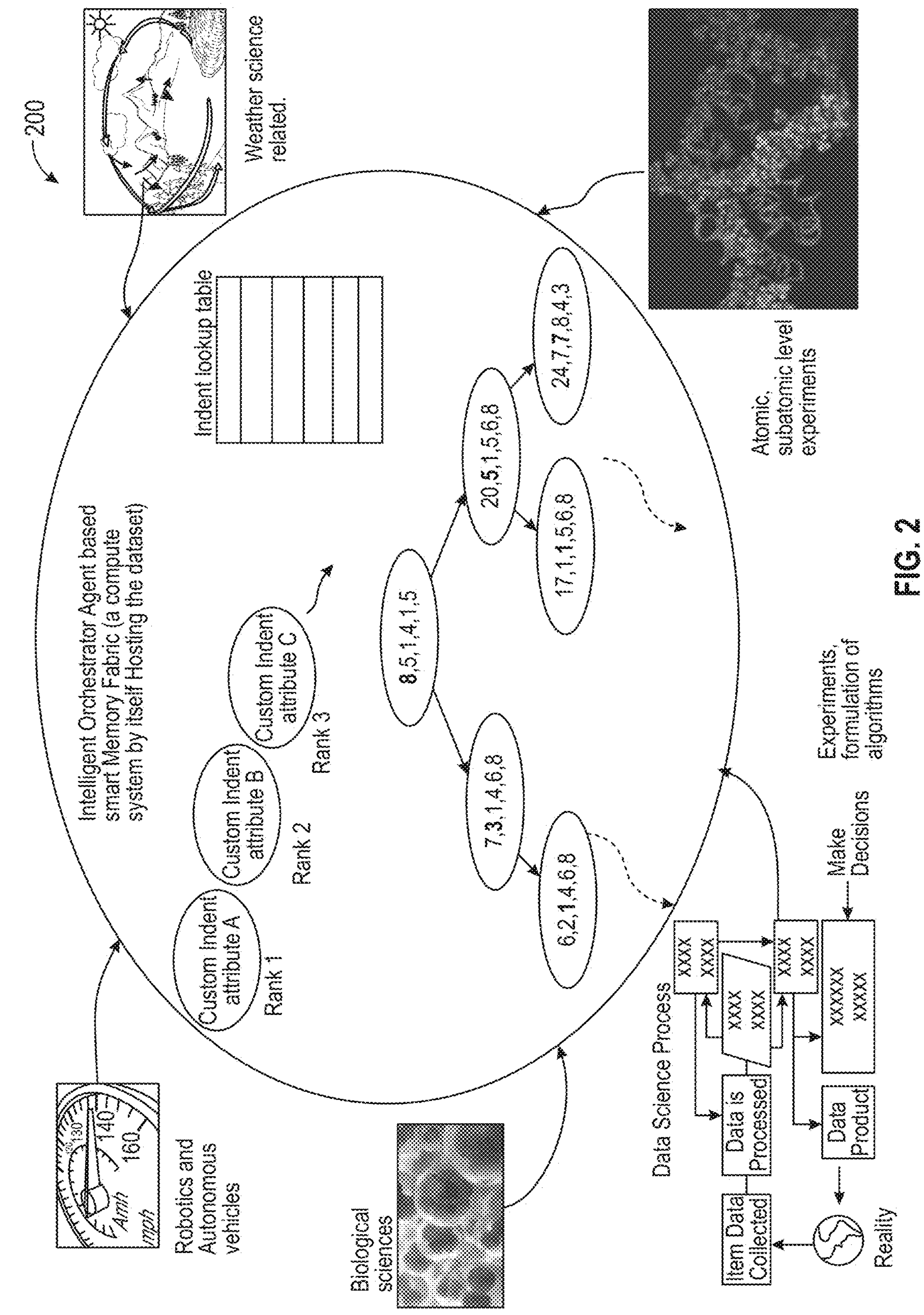
FIG. 2 illustrates a persistent memory, in accordance with some examples described herein.

FIG. 2 illustrates a persistent memory, in accordance with some examples described herein. In example 200, the persistent memory may store the instruction dumps. The persistent memory may be accessible from a memory centric fabric given the number of instruction dumps that are stored. The size of the persistent memory may be dynamic. In some examples, a specialized compute entity with the memory fabric may be interfaced to the system whose load-failure model can be generated.

In example 200, the system characterization ML model runs on a connected memory fabric or a fabric attached memory based centralized memory pool. It also contains a portion of the memory that may be demarcated for storing the assembly instruction dumps from several cores of the systems being modeled. The system may contain circuitry, like a DMA engine for the instruction dump module, to transfer the dumps to the demarcated region.

The system also provides an example schematic of a memory-centered high performance computing cluster. This system may provide a supercomputing architecture, where systems being modeled are the nodes of the cluster or supercomputer with integrated connections to all the systems. The logical baseboard management controller or cluster of logical baseboard management controllers may directly run on the memory fabric. In some examples, the logical baseboard management controller interfaces with each of several hundreds of connected devices to fetch the instruction dumps, failure events, or other data for each individual systems.

In some examples, the circular memory fabric may comprise logical BMCS. At the periphery, the system may execute various data modeling experiments, including weather modeling, robotics and automated vehicle, biological sciences, formulation of data science processes, atomic experiments, or other use cases. The applications may be executed by the compute nodes or blades for each of the experiments.

Figure 3:
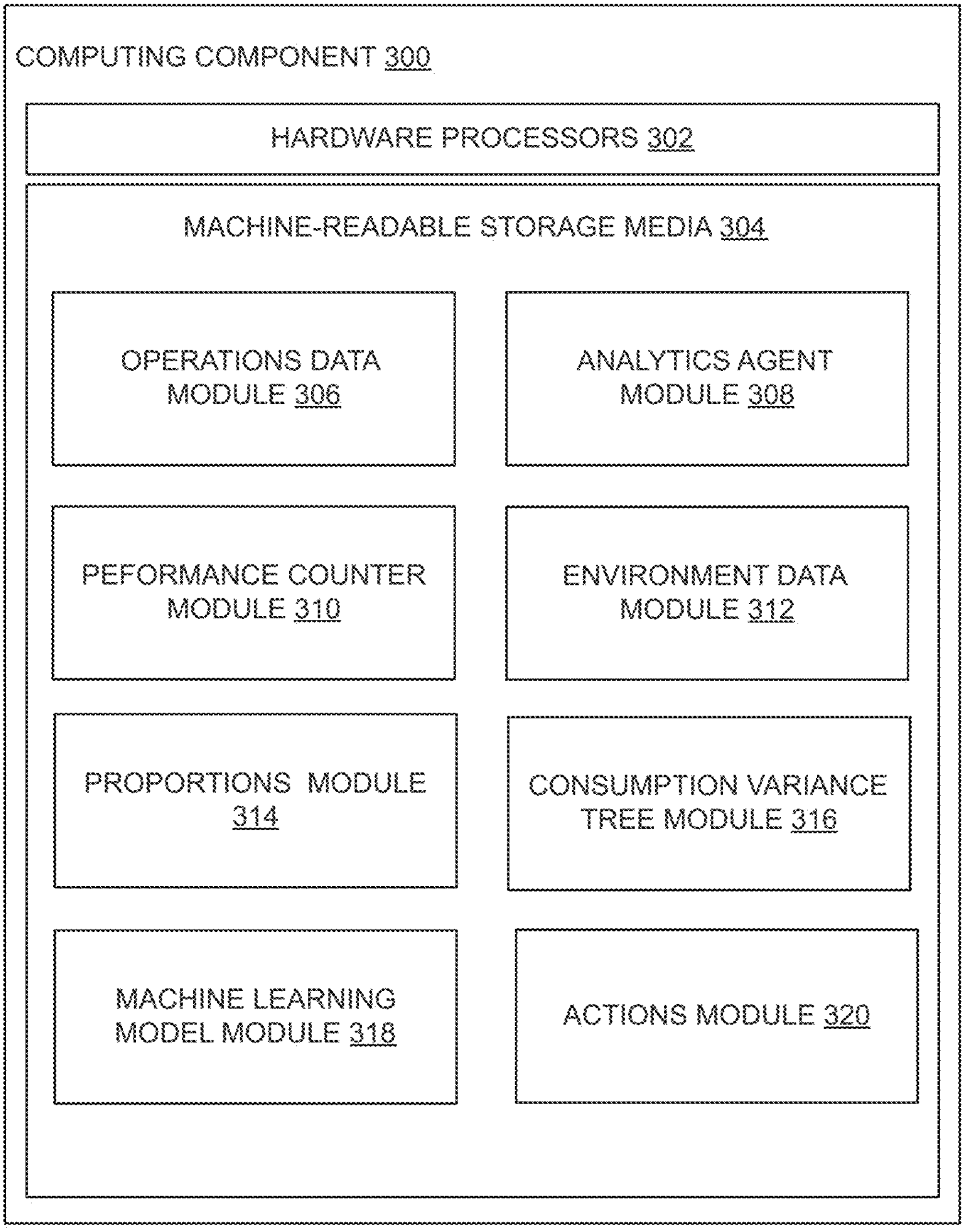
FIG. 3 illustrates a computing component for implementing integrated failure prediction with system modeling, in accordance with some examples described herein.

FIG. 3 illustrates a computing component for implementing integrated failure prediction with system modeling, in accordance with some examples described herein. Computing component 300 is illustrated, which may be, for example, a server computer, a controller, or any other similar computing component capable of processing data. Computing component 300 may be a device located at primary site 102 as illustrated in FIG. 1 that generates operational data.

Computing component 300 includes hardware processor 302 and machine-readable storage medium 304. Machine-readable storage medium may comprise various modules configured with machine-readable instructions executed by processor 302, including component operations data module 306, analytics agent module 308, performance counter module 310, environment data module 312, proportions module 314, consumption variance tree module 316, machine learning model module 318, and actions module 320.

Hardware processor 302 may be one or more central processing units (CPUs), graphics processing units (GPUs), semiconductor-based microprocessors, and/or other hardware devices suitable for retrieval and execution of instructions stored in machine-readable storage medium 304. Hardware processor 302 may fetch, decode, and execute instructions to control processes or operations associated with the various modules illustrated herein. As an alternative or in addition to retrieving and executing instructions, hardware processor 302 may include one or more electronic circuits that include electronic components for performing the functionality of one or more instructions, such as a field programmable gate array (FPGA), application specific integrated circuit (ASIC), or other electronic circuits.

Machine-readable storage medium 304, may be any electronic, magnetic, optical, or other physical storage device that contains or stores executable instructions. Thus, machine-readable storage medium 304 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 304 may be a non-transitory storage medium, where the term "non-transitory" does not encompass transitory propagating signals.

Operations data module 306 is configured to monitor operations performed by a device (e.g., using sensors, operational logs, etc.). Any of the device components may generate the operations data, including an operating system (O/S), software applications, UEFI/BIOS firmware or other system firmware, sprocket, DIMM, I/O, GPU, peripherals, ASIC, FPGA, or other hardware of the device.

The operations may be stored as operations data by operations data module 306. The operations data may be associated a time stamp of when the monitoring was detected and may vary based on the device that is being monitored. For example, when the device is a DIMM, the operations data may comprise activities and executions implemented by the device in a format corresponding with the compute to memory to an I/O (compute:memory:I/O). In another example, when the device is a computer processor unit (CPU) or graphics processor unit (GPU), the utilization of the CPU or GPU may be determined as operations data. When the device component is an input/output (I/O) device, the I/O operations (IOPS) usage may be stored as operations data.

The operations data may comprise operations detected by a baseboard management controller (BMC). For example, the operations may comprise a set of instruction dumps, I/O address maps and its access patterns, frequencies, DIMM error events, corrected or permanent failure records, environmental factors, usage patterns from a CPU performance counter, and other operational data. An illustrative example of fetching instruction dumps is provided in FIG. 4.

The operations data may comprise correctable and uncorrectable failure events associated with the device. For example, the operations data may comprise compute, memory, and I/O consumption of the device for configured time samples over a time distribution. In some examples, the operations data may comprise correctable events and uncorrectable events at the DIMM with timestamp and general environmental important events that are shown in the operations data.

In some examples, the components of the device work in tandem and generate operations data from a cluster of devices. As an example, the cluster of device may generate an amount of heat that gets dissipated due to environmental factors. The operations data can identify the effects of the heat that can cause the hardware of the device to progressively degrade and, in time, fail permanently.

In some examples, the operations data for DIMM may identify a corrected machine check. This event may be identified in operations data. The operations data may identify the device as experiencing not a permanent failure, but an intermediate failure that is correctable. The device may be identified as vulnerable. In the instance of the DIMM, the row and column that experienced the intermediate failure can become vulnerable and the overall durability of the device may be decreasing with an eventual failure.

In some examples, operations data module 306 is configured to create or aggregate operations data (e.g., with analytics agent module 308). For example, the operations data may be determined and clustered into similar types of operations detected by the device. The clusters of data may create new sets of data based on the originally collected operations data.

Analytics agent module 308 is configured to execute an agent software program that is executed locally at a device, generate operations data, and transmit the operations data to computing component 300 via a network/communication. The agent may determine the operations data associated with the device.

In some examples, agent may query the operations data of the device based on the NIC Partitioning (NPAR) multi-function mode. The NPAR may correspond with an identifier (NPAR-ID) that the agent can query and access the returned data. The NPAR may enable the system to partition a NIC into multiple virtual NICs with multiple PCI physical functions per port. In some examples, the NPAR corresponds to electronically isolated set of blades or chassis that run on a single system image or operation system.

In some examples, the agent fetches the operations data (e.g., compute, memory and I/O) from a Core Analysis Engine (CAE). The CAE may collect and aggregate the operations data for the agent. The CAE may be accessible by the agent or via a SSH command-line interface that reports events/operations experienced by the device.

In some examples, the agent fetches the operations data from a CPU performance monitor agent. The agent implemented by analytics agent module 308 may, in some examples, interact with CPU performance monitor agent to determine a total amount of time that the device (e.g., DIMM) was in different operational states. The operational states may comprise, for example, an active state, a standby power state, or custom intermediate power state. The standby power state may enable the device to execute only some subset of commands related to querying the system.

In some examples, the agent may be installed locally at the device and communicate with analytics agent module 308. The local implementation of the agent at the device may allow the agent to act as a controller of the agent (e.g., an out-of-band controller engine). In some examples, the controller may be a baseboard management controller (BMC) and implement manageability firmware (MFW). The controller may execute operations on the BMC and use a specialized BMC-main board communication interface to monitor the workloads and other system characteristics of the main board.

As an illustrative example, the main board may be one of four socketed HPC® boards that runs on HPC® compute element. The component may be an Accelerated Processing Unit (APU), AMD Instinct® MI300A, or processor like AMD Geneoa®, EPYC®, or a mission-critical blade that runs on Intel® XEON® Gold series high powerful processors. The main board may run HPC® Linux® or MCS enterprise windows operation system (e.g., Linux®, Microsoft® Windows®, etc.).

Performance counter module 310 is configured to implement a performance counter to measure a component usage pattern of the device (e.g., based on the operations data collected by operations data module 306). As an illustrative example, the performance counter may derive a ratio of total active standby power as compared to other power states of the device. The data collected by the performance counter may be added to the consumption variance tree (e.g., by consumption variance tree module 316). In another example, performance counter module 310 is configured to determine a compute:memory:IO consumption ratio for sixteen months (e.g., in a system partition that contains a collection of chassis or blades and operates as a single compute). The ratio may include events of a specific instance of a DIMM. It may be possible to create more than one performance counter in a given time frame (e.g., two values for one month).

Environment data module 312 is configured to determine internal or external data associated with the device. Internal factors may comprise an internal fan failure, temperature changes, or other internal environmental data that may or may not affect the operation of the device. External factors may comprise a temperature in a data center, power surges in a power grid, or other external environmental data that may or may not affect the operation of the device. For example, the processor of the device may execute instructions slower when the environmental data is above a threshold value (e.g., especially hot or cold). In terms of power consumption, the device may attempt to cool the system based on the environmental data exceeding the threshold value.

The environmental data may change during a time sample. Each of the changes in the environmental data may be determined and stored in a data store. In some examples, the environmental data is provided with the operational data of the device as input to the machine learning model to identify correlations between the data sources.

In some examples, environmental factor errors may be identified with processor or I/O errors. The environmental factor errors may be uncorrected memory errors. The environmental factor errors may help add more specific details related to components in the system. Environmental factor errors may be considered in the failure ranked DAG to adjust the ranking and priority of the nodes.

Proportions module 314 is configured to determine a consumption ratio of Compute:Memory:I/O operations of the device (e.g., comparing the proportion of compute operations to memory operations to I/O operations of the device). This consumption ratio, along with events like component failures and associated chain of events before a permanent failure of the device, may help predict future failures or other events.

The consumption ratio may correspond with, for example, a total number of compute variances as the ratio of memory to I/O during a point in time. In the example of DIMM compute operations, the usage is measured in the ratio of total amount of time in a specific power mode (e.g., active standby power) when a read and write operation occurs at the device versus any other power status. Other power status may include, for example, a self-refresh, low power states, or other operations related to power consumption through CPU performance counters. The ratio may be plotted as a node in a consumption variance tree.

Consumption variance tree module 316 is configured to create a consumption variance tree. For example, the system (e.g., via an agent, when applicable) may create a node tree, where each node comprises a time stamp corresponding with the time that the operational data was generated. The tree may be three-dimensional. The node may be inserted based on the variance of the compute:memory:I/O.

The consumption variance tree may be generated or augmented using a space partitioning process to define the augmented nodes in the consumption variance tree data structure. The tree may be a k-dimensional tree (k-d tree), or other space-partitioning data structure that is configured to organize points in a k-dimensional space (e.g., k-orthogonal axes or a space of any number of dimensions). In some examples, every node in the tree may correspond with a k-dimensional point. The k-dimensional tree may be incrementally modified to create a new data structure called a "selective node augmented k-d tree." The selective node augmented k-d trees may be used to create consumption variance trees that are annotated with failure events and environmental factors.

In constructing the consumption variance tree, consumption variance tree module 316 may traverse down the tree to iteratively cycle through the axes and select the splitting planes. The points are inserted into the tree by selecting the median of the points being put into the subtree, with respect to their coordinates in the axis being used, to create the splitting plane. The process may generate a balanced k-d tree, in which each leaf node is approximately the same distance from the root.

In some examples, the consumption ratio may be added as a node to the tree. As an illustrative example, the system may identify two distinct consumption ratios within a thirty day time frame (e.g., at twenty days and ten days). Both consumption ratios can be added to the tree. The failure events associated with the device may also be added to the tree. For example, each instance that the failure corresponds with a corrected or recovered failure event may be associated with a first color and each event that the failure is permanent (e.g., the component in the device needed to be replaced) may be associated with a second color. All other nodes may be a third color. These colors may be the augments applied to applicable, selective nodes of the trees.

In some examples, the tree may be color-coded. The colors may correspond with the type of failures that the operational data is identifying. For example, the color red for the node may correspond with any permanent failure events. The color yellow for the node may correspond with any corrected or recovered failure events. The color green for the node may correspond with no failure event detected. In some examples, the k-d trees include selective data points in the dimensions that are augmented with additional attributes/features. Other implementations may be executed without diverting from the essence of the disclosure, and the colors are provided for illustrative purposes only.

Consumption variance tree module 316 is also configured to determine optimal clusters and prune clusters from the tree. For example, a Pareto Optimal Cluster may be executed to identify unique devices in the operations data. The unique devices can be studied to identify the device behaviors (e.g., processor capacity, component configuration, microelectronic component operations, firmware/software operations, innumerable macro to miniature compute systems and other types of microelectronic components of robotic devices, driverless cars, or medical devices, or other physical or logical device operations). Other clusters may be determined as well without diverting from the essence of the disclosure.

In some examples, consumption variance tree module 316 may implement a failure prediction with the pruned trees (with machine learning model module 318). For example, the pruned trees may be grouped as a single node of another tree. The pruned trees are pruned at the red nodes to remove any nodes that occur past the failure event. The paths with the predicted temporary failures (yellow nodes) may be combined with adjacent similar sub-trees. The failure path may be determined and chosen by a k-means clustering algorithm. In some examples, if yellow and red nodes are found in a path, then consumption variance tree module 316 may consider the operations path until a red node as the termination point.

The process may be repeated iteratively. For example, the pruned tree groups may form a single node in an MCTS game tree, which is analyzed by a MCTS algorithm. The self-learning MTCS algorithm can create several permutations of simulated pruned tree groups by implementing a training process on the pruned tree group dataset that is collected through the consumption variance tree. The consumption variance tree may be generated with the instruction dumps variances as nodes (e.g., identifying the ratio of compute:memory:io). Some of the nodes may correspond with annotated or augmented failure events nodes, using the k-d tree with selective node augments method.

In response to presenting a new failure prune tree node, the process may create a refined path or more sub trees, and determines a caution point using a value functions through the chain of nodes. This process may repeat iteratively. For a new given device/DIMM, the consumption variance tree is determined and the process extracts pruned failure path sub-trees. The pruned failure path sub-trees are provided to the hardware component failure MCTS algorithm to generate the game tree with multiple caution points (e.g., value estimates) and failures (e.g., reward) that serves as the reference to take precautionary steps (as implemented by actions module 320).

In response to utilizing the new hardware entity or a heterogeneous cluster with a plurality of diverse compute entities, the trained MCTS model can generate a consumption variance tree that refers to the pruned tree groups. The consumption variance tree may include all possible transient, permanent failures that can occur in all of the electronic or microelectronic components of the nodes in the cluster as a predictive model. The model can be used as a reference to forecast the capital and operating expenditure in the data center in predictive way. Several other applications can be planned predictively as well, including tuning processing workloads, operating air conditioning (A/C), planning operations of the data center environment, or placing external devices within data center.

For a given device, a Monte Carlo Tree search may be implemented. For example, the Monte Carlo Tree search may access the tree that is modeled on a device and create caution points or likelihood checks. The red nodes are pruned consumption variance trees that identify permanent failure events. The caution points denote a failure likelihood and precautionary actions can be taken.

Machine learning model module 318 is configured to receive the consumption variance tree as input, which illustrates a device's usage in terms of power consumption, failure events, internal/external environmental factors, and other data described herein and generate the system characterization ML model. The model may be trained with multiple instances of the consumption variance tree and corresponding color patterns for the nodes. The output of the first system characterization ML model may comprise a predicted failure of the operations performed by the device (e.g., deterioration of the component, hardware failure, inefficiencies in CPU utilization and memory usage, I/O device data transfer, access, etc.). For example, in the context of USB I/O devices, it may take more time for the USB device to be identified and provided to an interface as an available drive or to use the drive to transfer data.

In some examples, the system characterization ML model is trained using a hash table of consumption variance trees that are generated for several time distributions. Training the model may help generate predictions for fine-grained differences in system configurations. For example, in order to train the model, machine learning model module 318 may implement deep reinforcement learning to learn a failure path from a set of consumption variance trees. The training may also create a number of viable simulations with available search tree with available actual failure patterns to correlate operations data and other consumption values with a failure chain of pre-events.

In some examples, the training data may comprise various consumption patterns for the device that may be stored as operations data. The trained model can generate a prediction to a granular level of what would be the predicted operations data generated by the device on a specific day in future. The device may indicate a cluster or a high performance computing cluster where the system characterization ML model can generate data using the electronic or microelectronic operations of all the participating nodes.

Actions module 320 is configured to provide a device configuration to an interface to implement as a new device or reconfigure an existing device in accordance with the device configuration. In some examples, the action may include assigning a different device with a particular workload (e.g., memory intensive workload) or planning execution times based on the predicted health of the components of the device.

Figure 4:
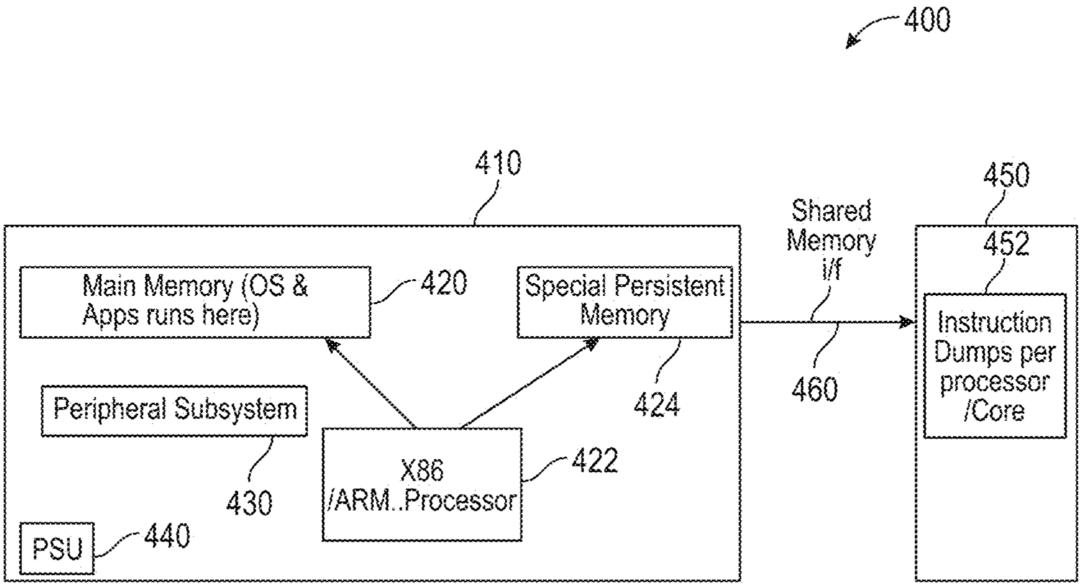
FIG. 4 illustrates an instruction dump which may be assembly instruction dumps in operations data, in accordance with some examples described herein.

FIG. 4 illustrates an instruction dump in operations data, in accordance with some examples described herein. In example 400, device 410 and a baseboard management controller (BMC) 450 are illustrated. For example, the operations may be executed at device 410 and monitored by an agent at device 410 or received by BMC 450 via a communication network or via shared memory interface 460. The operations data can comprise a set of assembly instruction dumps, I/O address maps, DIMM error events, permanent failure records, environmental factors, usage patterns from a CPU performance counter, and other operational data.

Device 410 may comprise, for example, main memory 420 that stores an operating system and software applications, processor 422, and special persistent memory 424 (e.g., as a first data store at device 410). Device 410 may also comprise other components, including peripheral subsystem 430 and power supply unit (PSU) 440.

In the instance of instruction dumps, for example, the operating system may execute workloads (e.g., that can be stored as operations data). The workload may be executed for a configured time and correspond with an instruction pointer for the workload. For example, the value in the instruction pointer can correspond with a designated region on a special NVDIMM. The value for the instruction pointer may be stored in special persistent memory 424. A logic gate circuitry can may continuously store/dump the instructions executed by fetching the value in the instruction pointer and storing it in the share connected memory fabric based persistent memory 450.

The value in the instruction pointer may be transmitted through a dedicated high speed dump-core similar to DMA, to second data store 452 (e.g., via a manageability firmware (MFW) through a shared memory interface). In some examples, the CPU cycles or bandwidth of the processor that runs a typical HPC or mission critical workload is not consumed. When an agent is implemented (e.g., by analytics agent module 308 in FIG. 3), the agent can determine an absolute consumption ratio of compute, memory, and I/O operations that occurred during the given time period by doing offline/out of bands instruction dump analytics (e.g., by determining the ALU, load/store to memory, MMIO ranges, and other information in the instruction dumps).

In some examples, the instruction may be fetched from main memory 420 and passed as a value to the instruction pointer with secondary information. The secondary information may comprise computer-readable instructions to dump the instruction opcode and operands to persistent memory 424.

In some examples, the secondary information is configurable by a user. When the feature to send/store the secondary information is enabled, the instruction pointer is written to the programmed memory location. In some examples, the programmed memory location is a special persistent memory. Given volume of the instruction dump, the programmed memory location may be a large memory pool in a fabric attached memory. This logic can be configured to store the EIP values in a configured memory location (e.g., NVDIMM).

In other examples, the BIOS/OS may execute a process via the performance counters to store the instruction pointer. In an ARM® platform, for example, the instruction pointer may correspond with program counter "R15," which can be stored through a microcode support. In other examples, the instruction dumps may be implemented with logic gate circuitry in an ASIC. In this example, the instruction may be dumped from CPU instruction pipeline to a persistent memory. In other examples, the instruction may be dumped in performance counters, as described herein.

In some examples, shared memory interface 460 a circular memory fabric to connect with all of the compute entities. These and other compute entities may require modeling.

FIG. 5 Illustrates a Data Store for a Consumption Pattern Ratio, in accordance with some examples described herein. In example 500, a compute:memory:I/O consumption pattern ratio is stored in the data store, including operations data comprising compute operations 510, memory operations 520, I/O operations 530, failure events 540 for the specific instance of the device, environmental data 550, and a time frame 560.

In some examples, it is possible to have two values for one time period. For example, if there are two distinct consumption ratios observed in the time period (e.g., at twenty days and at ten days), they can both be stored in the data store.

The tree may comprise nodes that are correspond with different colors. For example, the corrected/recovered failure events may correspond with yellow and the permanent failures may correspond with red (e.g., that resulted in replacement). The usage of the device may be measured in ratios of total amount of time in a sample, the DIMM was in active standby power (when read and write operations occurs) versus other power status viz. self-refresh, low power states, etc. through CPU performance counters.

The colors of nodes may be determined by a k-means grouping algorithm. For example, yellow nodes may be selected based on events in operations data and environment data that occurs prior in time to a failure event. In some examples, adjacent nodes in a sub-trees may be adjusted to a similar color-coding, for example, if yellow and red nodes are found in a path, then the node path may be considered likely to end in a red node or other termination point.

Figure 6:
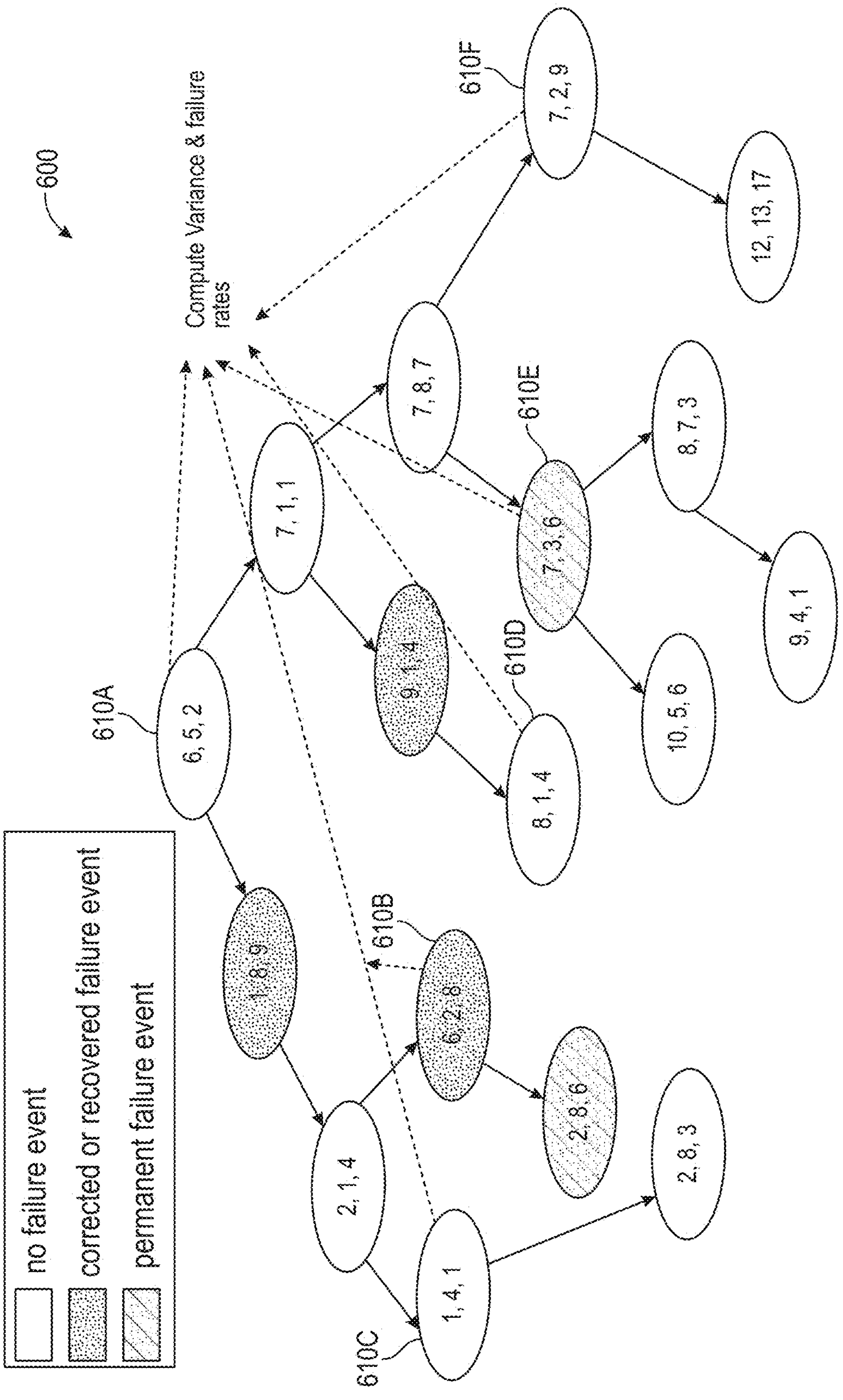
FIG. 6 illustrates a consumption variance tree, in accordance with some examples described herein.

FIG. 6 illustrates a consumption variance tree, in accordance with some examples described herein. In example 600, a consumption variance tree with nodes for a single hardware instance is illustrated. The tree may comprise failure paths and environmental changes, which are identified as compute variance points of interest 610 (illustrated as first compute variance points of interest 610A, second compute variance points of interest 610B, third compute variance points of interest 610C, fourth compute variance points of interest 610D, fifth compute variance points of interest 610E, and sixth compute variance points of interest 610F). Nodes corresponding with compute variance points of interest 610 may have values {6,5,2}, {6,2,8}, {1,4,1}, {8,1,4}, {7,3,6}, and {7,2,9}.

In example 600, multiple sub-clusters can be inferred based on variances. Similarly, memory and I/O variance points and succeeding chains of sub-trees can be used to form pruned groups of nodes. The operational data may be used to identify indentations in the trees. The failure events and internal/external environment factors may be added to indent the tree or otherwise adjust the relationships between the nodes (e.g., for an instance of DIMM on a specific device). The indentations can be based on pre-events in operations data before a failure event, any subsequent permanent component failure event, and internal/external environmental data changes during a time sample (e.g. an internal fan failure, temperature changes, etc.).

The pruned groups of nodes can be used for policy framing. Independently, compute variance points of interest 610 with a co-relation of the environmental data and failure events can be used for various other forecasting and inference formation (e.g., the total number of compute variances, the ratio of memory and I/O during a point in time, and the tree descent's branches).

Figure 7:
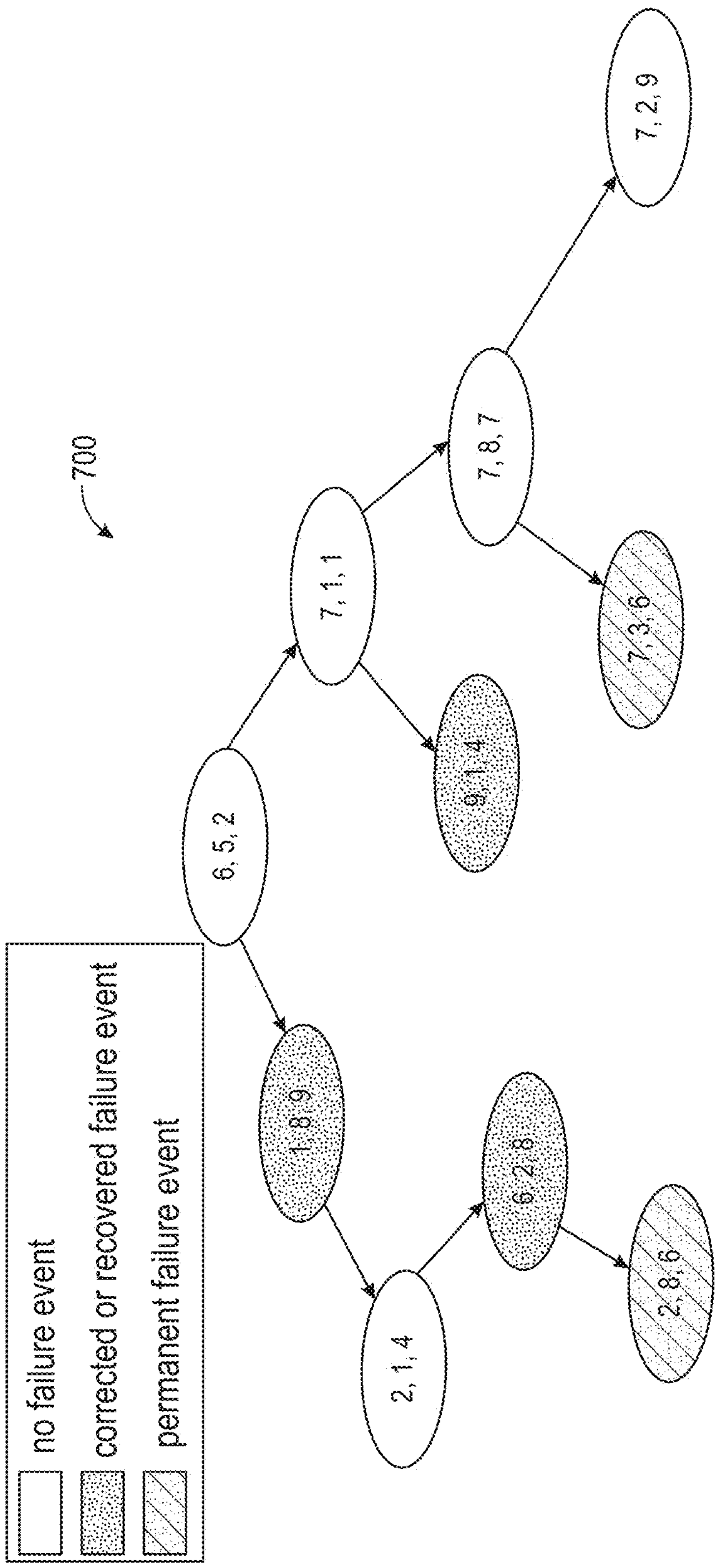
FIG. 7 illustrates a pruned consumption variance tree, in accordance with some examples described herein.

FIG. 7 illustrates a pruned consumption variance tree, in accordance with some examples described herein. In example 700, the consumption variance tree of FIG. 6 is pruned and nodes are removed for the same single hardware instance. The nodes may be pruned based in part on historical consumption variance trees and output from the trained system characterization ML model. For example, the consumption variance tree can be generated by the model for a given new system configuration, where the system configuration is continuous variable. This is distinguishable from general methods where the system configuration is used and continuous variable is used to create a discrete class.

Figure 8:
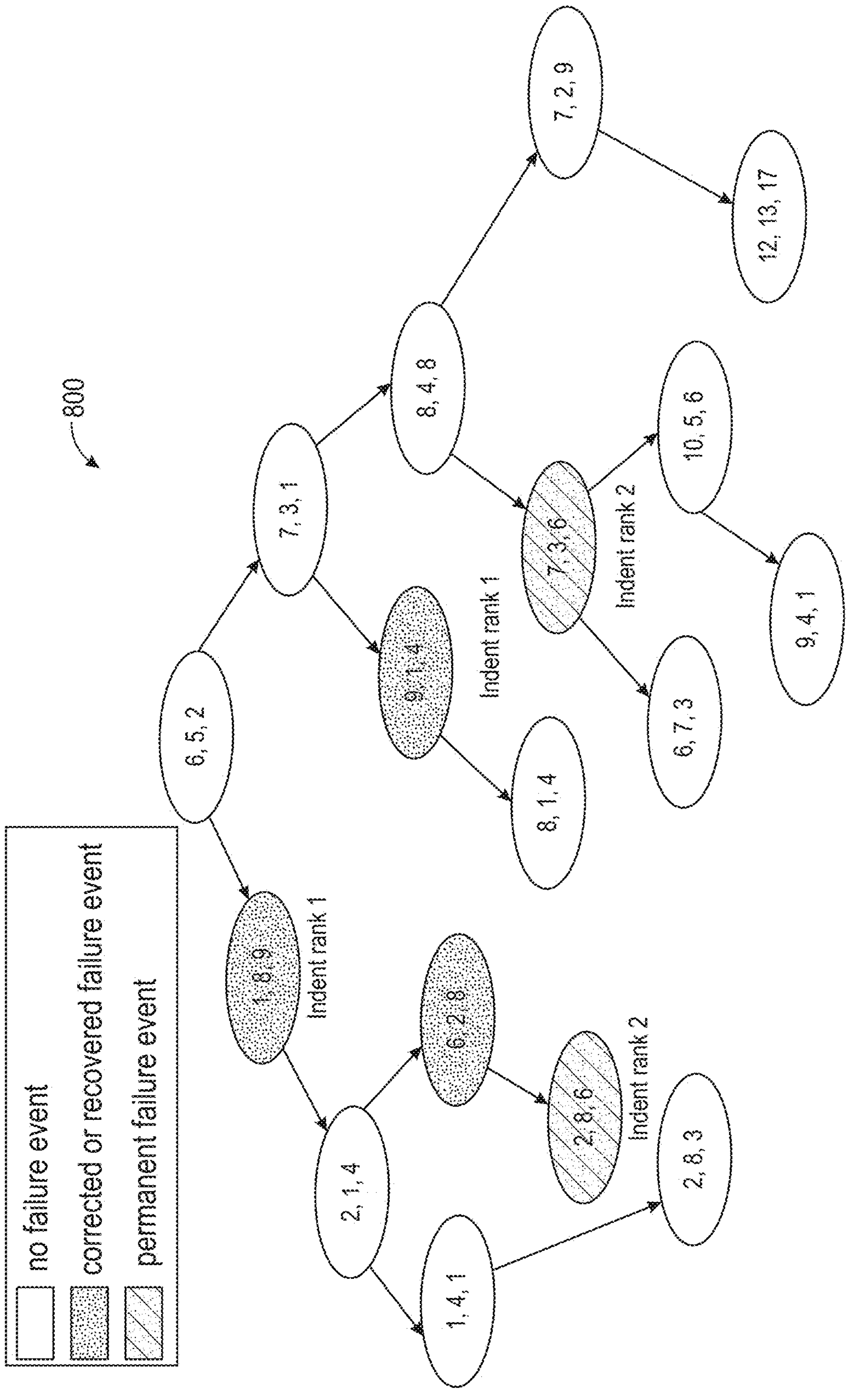
FIG. 8 illustrates a consumption variance tree with a ranked failure event annotation, in accordance with some examples described herein.

FIG. 8 illustrates a consumption variance tree with a ranked failure event annotation, in accordance with some examples described herein. In example 800, the consumption variance tree includes a failure event annotation. In some examples, the tree may be annotated with a ranked failure event or an environmental event.

In some examples, the pre-failure events can be ranked based on severity. For example, an occurrence of single bit may be identified in the data as having a correctable error (e.g., pre-failure event, rank 1). In some examples, more or different characteristics of the data may be identified. Two bits may identify two occurrences of correctable errors (e.g., pre-failure event, rank 2), a device/DIMM seating issue may be identified as a correctable error, device/DIMM issues that caused signal integrity between the DIMM and CPU integrated memory controller (e.g., pre-failure event, rank 3), a correctible memory controller channel issues resulting in some DRAM chips inaccessible (rank 4), a repeated post-package repair (PPR) characteristic error (e.g., pre-failure event, rank 5), or a permanent error (e.g., failure, rank 6).

In some examples, errors in instruction execution sequences (e.g., errors in CPUs L1, L2, L3 caches) are present in the instruction dumps. The errors may be included in the execution of handling of these errors through privileged instructions or exceptions that occurred which indicates such errors.

In some examples, errors in the network I/O data transfer are present in data checksum errors or failed transfer error handling. The messaging identified may have been generated and transmitted throughout the system. In some examples, these errors may be present in instruction dumps for network I/O devices like NIC, fiber optic, or wireless messages (e.g., IEEE802.11 a/b/g).

In some examples, errors in the storage I/O transfer are present in various messages. These may include, for example, file system access errors, instruction sequences related to RAID EXT4 checksum mismatch, or any exception interrupts that occurred (e.g., as indicated exception handler assembly instruction sequences present in the instruction dump).

In some examples, errors in the backplane I/O cards are present in messaging as well. For example, the errors may be identified in a PCIe backplane or as hot plug/swap errors.

In some examples, error handling related to a left and right expander ports (e.g., of an HPC backplane board) may be identified. The ports may be compatible with FPGAs. The errors may be identified as exception handlers in the instruction sequences with the I2C bus number and address assigned to these devices.

In some examples, errors may be uncorrectable errors, fatal errors, or non-fatal errors. Some uncorrectable errors, like a failing row in a DIMM, can be managed by using the spare rows that are functional. In some examples, the error may be repeated in spare rows also. The error may affect DIMM signal integrity or inaccessibility of some rows or banks is fatal that requires the DIMM card replacement.

In some examples, errors may be identified in instruction sequences in the instruction dump. The instruction sequences may indicate system software initiated events. An illustrative example is in an operating system and the instruction sequence may include hard/soft page off lining in Linux OS®.

In some examples, instruction sequences may update corrected platform error records (CPER). The platform error record may be maintained in CER tables. The maintenance may be executed by machine readable instructions by the firmware or before an operating system is initiated (e.g., like UEFI/BIOS). The memory driver may detect errors when the OS is running. This may identify an instruction sequence that, if present in the instruction dump, can be considered to find the non-volatile memory errors.

In some examples, the ranking may be augmented with additional data. The additional data can identify a system load value with any hardware component failure events. In some examples, the consumption variance tree may correspond with a ranked failure ordered directed acyclic graph (DAG). In some examples, system modelling can be executed using {compute:memory:io} with additional data. In this instance, the additional data may identify an adverse or surprise environmental factors, pre-failure or failure events, and the like. Illustrative adverse environmental factors may include power faults, failure in fault tolerance system, or power surges in sub-regions of a large data center. The faults and surges may be caused by load balancing that results from a large number of workloads.

The surprise environmental faults may comprise card power faults, industrial automated system controlled data center thermal sensor faults, A/C or any liquid cooling system malfunctions (e.g., in some distance of data center), industrial automation device related to monitoring and control systems malfunctions, or other environmental issues. The surprise environmental faults may comprise issues that affect various devices, including a blade, chassis, or compute node.

Figure 9:
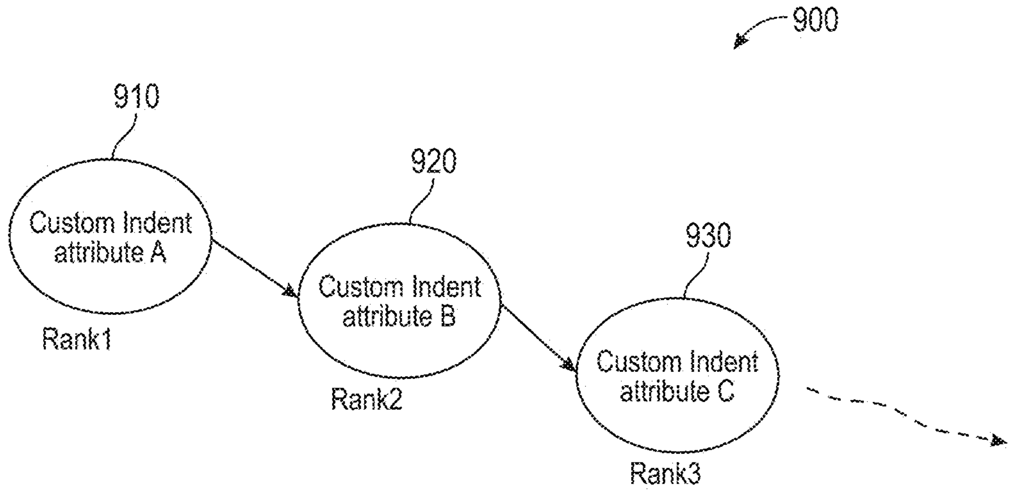
FIG. 9 illustrates a ranked augment attributes in an order depicted by a failure rank precedence DAG, in accordance with some examples described herein.

FIG. 9 illustrates a ranked augment attributes in an order depicted by a failure rank precedence DAG, in accordance with some examples described herein In example 900, data points having common indents are illustrated. The custom indents, through algorithmic provision, can be organized as a directed acyclic graph. The DAG may include root node 910 that has highest rank or priority. Subsequent nodes 920, 930 from root node 910 may correspond with a subsequent or descending order based on their presence from root node 910. The algorithmic provision process may determine custom indents or ranks for failure events. The indents/ranks may be organized per component based on various parameters. The parameters may include the severity of the failure event, the adverse functional impact, or whether the failure event is correctible or a permanent error.

Figure 10:
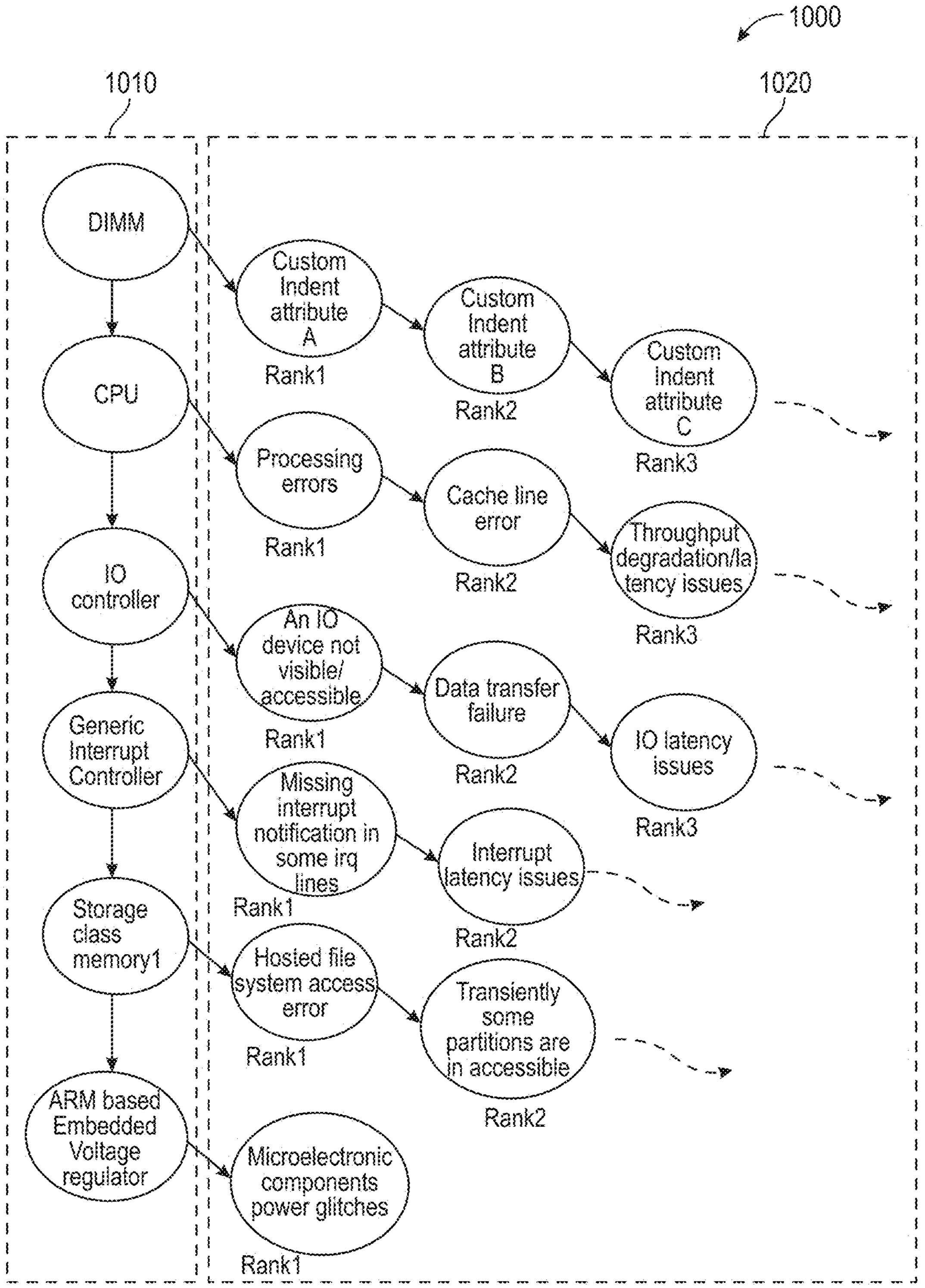
FIG. 10 illustrates a ranked augment attributes in an order depicted by a failure rank precedence DAG, in accordance with some examples described herein.

FIG. 10 illustrates a ranked augment attributes in an order depicted by a failure rank precedence DAG, in accordance with some examples described herein. In example 1000, various hardware configurations are provided in block 1010 and indents/augments are provided in block 1020.

In some examples, the system may obtain training hardware configuration information comprising an attribute value corresponding to a reference hardware type and load characteristics with failure and pre-failure events that has occurred with environmental characteristics affecting hardware components. The hardware configuration information may be stored as a node, as illustrated in block 1010.

In some examples, the system may derive the training attribute value from the training hardware configuration and the load characteristics annotated with the failure, pre-failure, and environmental factors. The system may train an ML model, including the system characterization ML model described throughout the disclosure. The training may be implemented using the training attribute value. The ML model may be trained to generate a set of ranked indents/augments for select nodes in the consumption variance tree data structure.

In some examples, the set of ranked indents/augments is implemented as an ordered directed acyclic graph comprising a plurality of nodes, as illustrated in block 1020. Each node may represent a specific ranked argument and multiple nodes of the plurality of nodes are connected by edges to form a first logical path to a terminating node. The order of the logical paths may represent an increasing severity of ranked indents/augments.

In some examples, the system may traverse the tree. By traversing the tree, the system may determine whether any node from the plurality of nodes corresponds to the ranked augment. If no node is found, the system may add a new root node of ranked augment where in the new root node is connected to an existing root node in parallel.

Figure 11:
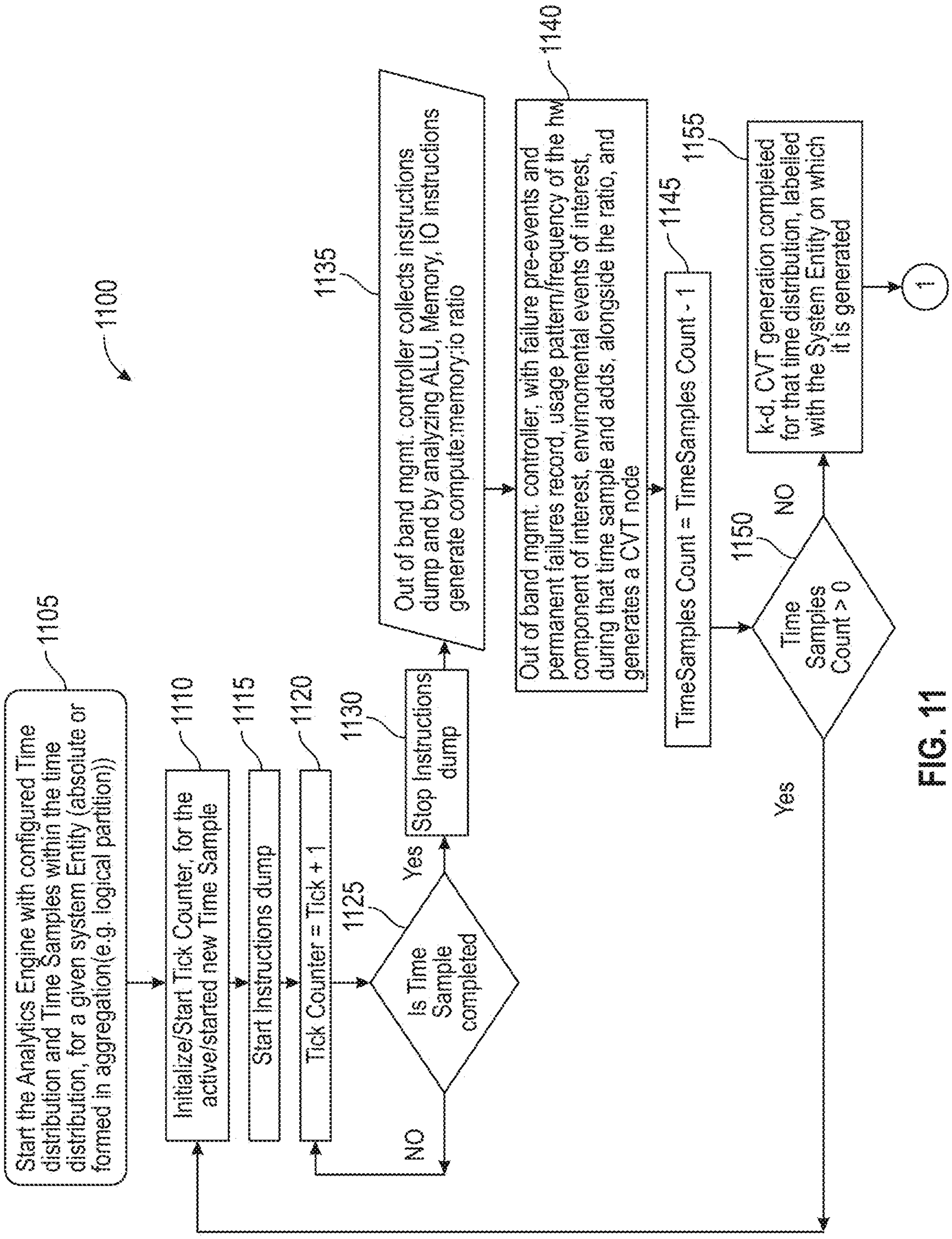
FIG. 11 illustrates an integrated failure prediction process with system modeling, in accordance with some examples described herein.
Figure 11:
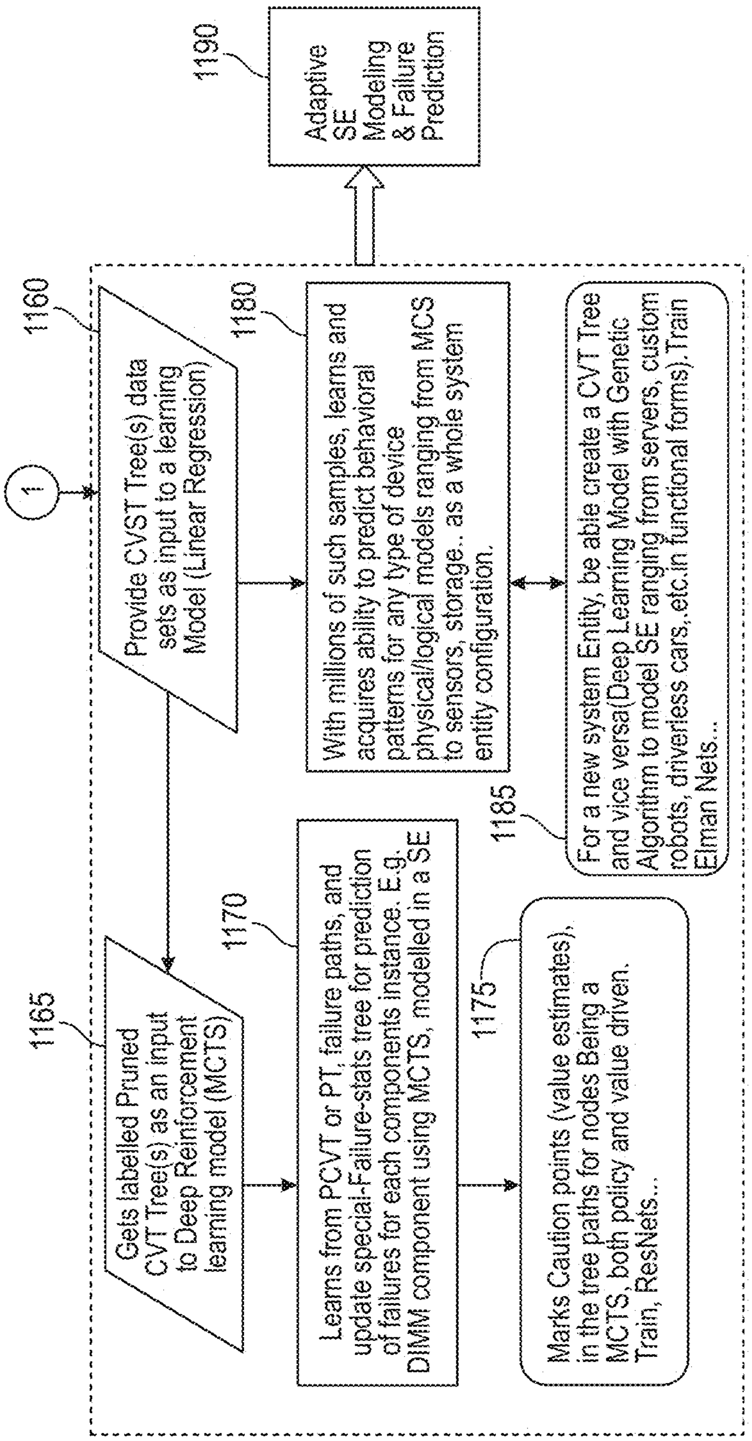

FIG. 11 illustrates an integrated failure prediction process with system modeling, in accordance with some examples described herein. In example 1100, the system is implemented as a computing component (e.g., computing component 300 in FIG. 3).

At block 1105, the process may start the analytics engine with a configure time distribution and time samples within the time distribution. The time distribution may correspond with operations data that is collected over time period. The time distribution may correspond with a device. The device may correspond with a single device, system entity, or other similar compute, or an aggregated collection of components to form a device.

At block 1110, the process may initialize a tick counter variable. The tick counter variable may correspond with an active analysis of the device operations. The tick counter may be active for a new time sample of operations data for the device.

At block 1115, the process may start an instruction dump.

At block 1120, the process may increase tick counter variable by one and store the new value back to the tick counter variable.

At block 1125, the process may determine whether the time sample is complete. If yes, the process may proceed to block 1130. If no, the process may proceed to block 1120.

At block 1130, the process may stop the instruction dump.

At block 1135, the process may initiate an out-of-band management controller. The controller may collect the data associated with the instructions dump. In some examples, the process may analyze compute, memory, and I/O instructions and generate a ratio between the values.

At block 1140, the process may initiate an out-of-band management controller that can initiate the commands to fetch the failure pre-events and events corresponding with permanent failures. The process may identify usage patterns and usage frequency of the device. The process may also determine environmental events, and other information during the time sample. The process may add the ratio and generate the consumption variance tree node.

At block 1145, the process may initialize a time samples count variable. The time samples count variable may correspond with an active analysis of the number of time samples that have been collected. The time samples count variable may be increased by one and the new value may be stored back to the variable.

At block 1150, the process may determine whether the time samples count variable is greater than zero. If yes, the process may proceed to block 1110. If no, the process may proceed to block 1155.

At block 1155, the process may generate a consumption variance tree (e.g., as a K-d variable tree with selective node augments). The generation of the tree may be completed for the time distribution and labeled with the device on which it is generated.

At block 1160, the process may provide the consumption variance tree as input to a machine learning model (e.g., using linear regression).

At block 1165, the process may prune the consumption variance tree and provided the pruned tree as input to a deep reinforcement learning model (MCTS).

At block 1170, the process may learn from the pruned consumption variance tree. For example, the pruned consumption variance tree may be analyzed to identify the failure paths and update a special failure statistics tree. The special failure statistics tree may be used for prediction of failures for each component instance. For example, a DIMM component using the deep reinforcement learning model (MCTS) may be modeled as the identified device.

At block 1175, the process may identify and mark caution points as value estimates in the tree paths of the node being a deep reinforcement learning model (MCTS). The mark caution points may be both policy and value driven.

In some examples, the MCTS model may be based on a game tree. For example, as explained herein, the hundreds of CVTs can be used in Resnets with hundreds of layers of convolutional neural network (CNN). This system architecture may be used for larger problems, for example, involving system characterization and workload analytics, security threat modeling (e.g., where the patterns include millions of consumption variance trees that are passed to selective layers to find the correlation), or identifying unauthorized physical intrusion in the data-center as one critical surprise environmental factor related to threat model and unauthorized access.

At block 1180, the process may learn and acquire the ability to predict behavioral patterns for any type of device models. These models may include physical and logical models ranging from a deep reinforcement learning model (MCTS) to sensors and storage as a whole device configuration.

At block 1185, the process may create a consumption variance tree for a new device. Other models may be created as well, including a deep learning model with a genetic algorithm, driverless cars, and other operations in functional forms.

In some examples, an Elman neural network is implemented. The variant may be involved in modeling a larger artificially intelligent systems within a premise, for example, running within a mobile robotic element. The model for the robotic element can be trained to control/rectify the degrading environmental factors or generate an alert.

At block 1190, the process may implement an adaptive device modeling and failure prediction inference process. The new data may be provided to the modeling and an output may be generated based on the modeling.

Multiple clusters for a class of devices can be derived. For example, in genetic modeling, functional clusters of devices or other system entities can be identified and differences between the clusters can be determined. The process may implement a self-organizing platform of data that can identify minute differentiations.

It should be noted that the terms “optimize,” “optimal” and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

Figure 12:
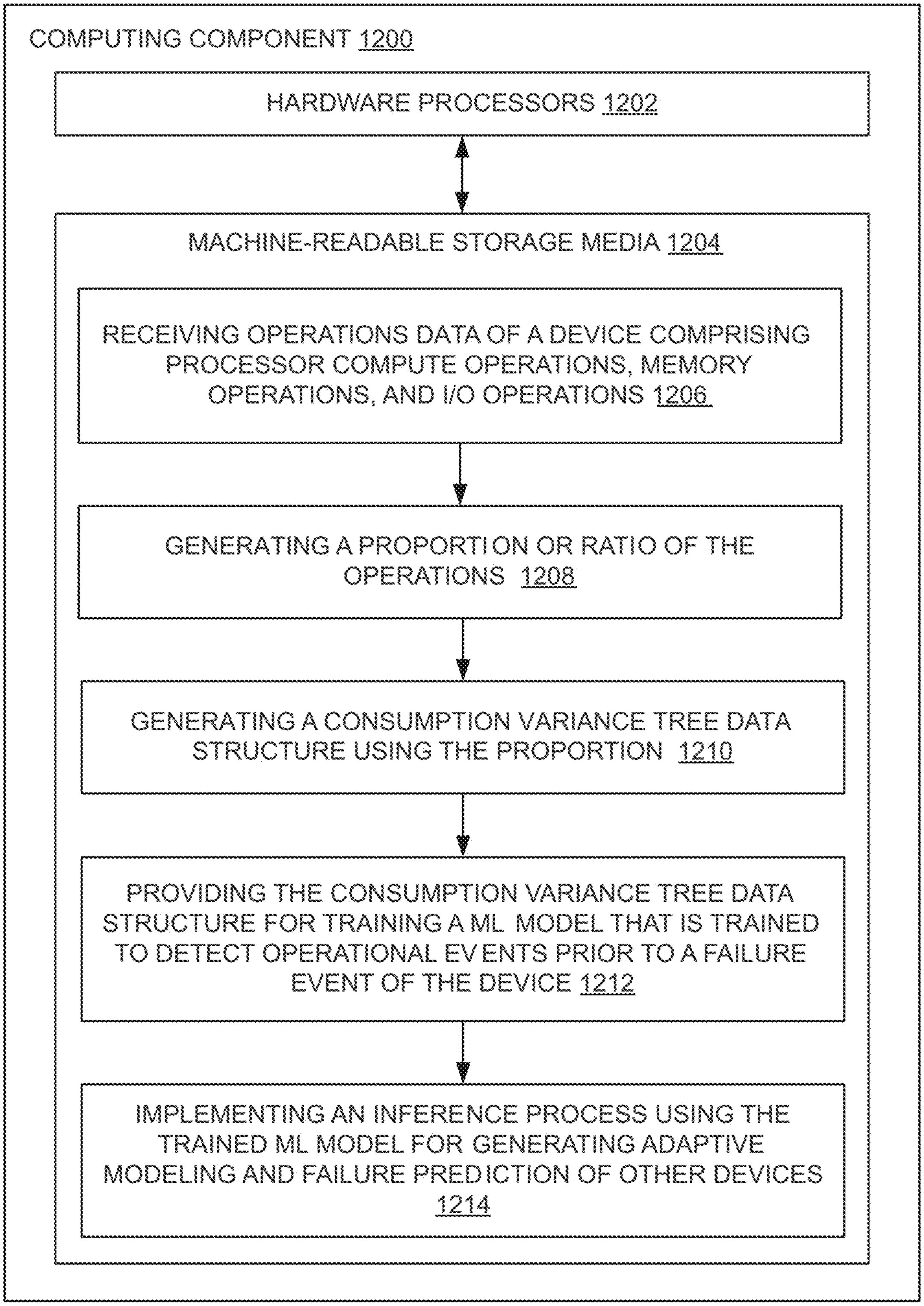
FIG. 12 is a computing platform that may be used to implement examples of the disclosed technology.

FIG. 12 illustrates a computing component that may be used to implement an integrated failure prediction in accordance with various examples of the disclosed technology. For example, computing component 1200 may be a server computer, a controller, or any other similar computing component capable of processing data. In the example implementation of FIG. 12, the computing component 1200 includes a hardware processor 1202 and machine-readable storage medium 1204.

Hardware processor 1202 may be one or more central processing units (CPUs), semiconductor-based microprocessors, and/or other hardware devices suitable for retrieval and execution of instructions stored in machine-readable storage medium 1204. Hardware processor 1202 may fetch, decode, and execute instructions, such as instructions 1206-1214, to control processes or operations for integrated failure prediction. As an alternative or in addition to retrieving and executing instructions, hardware processor 1202 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 1204, may be any electronic, magnetic, optical, or other physical storage device that contains or stores executable instructions. Thus, machine-readable storage medium 1204 may be, for example, Random Access Memory (RAM), non-volatile RAM (NVRAM), an Electrically Erasable Programmable Read-Only Memory (EEPROM), a storage device, an optical disc, and the like. In some examples, machine-readable storage medium 1204 may be a non-transitory storage medium, where the term “non-transitory” does not encompass transitory propagating signals. As described in detail below, machine-readable storage medium 1204 may be encoded with executable instructions, for example, instructions 1206-1214.

Hardware processor 1202 may execute instruction 1206 to receive operations data of a device comprising processor compute operations, memory operations, and input/output (I/O) operations. In some examples, computing component 1200 is a system comprising a memory-centered system architecture with a fabric-attached memory based cluster of devices. The operations data may be received via the fabric and stored with the memory.

Hardware processor 1202 may execute instruction 1208 to generate a portion or ratio of the operations. In some examples, the processor may determine a consumption ratio from the operations data with the processor compute operations as a ratio of the memory operations to the I/O operations during a time range.

Hardware processor 1202 may execute instruction 1210 to generate a consumption variance tree data structure using the proportion or ratio. The generation of the consumption variance tree data structure may be associated with the processor compute operations, the memory operations, and the I/O operations.

In some examples, the consumption variance tree data structure records a pattern of the consumption ratio over the time range and a failure event of the device. The failure event may be identified in the consumption variance tree data structure.

Hardware processor 1202 may execute instruction 1212 to provide the consumption variance tree data structure for training a machine learning (ML) model. The ML model may be trained to detect operational events prior to a failure event of the device.

Hardware processor 1202 may execute instruction 1214 to implement an inference process using the trained ML model. The inference process may generate adaptive modeling and failure prediction of other devices in association with the time range.

Figure 13:
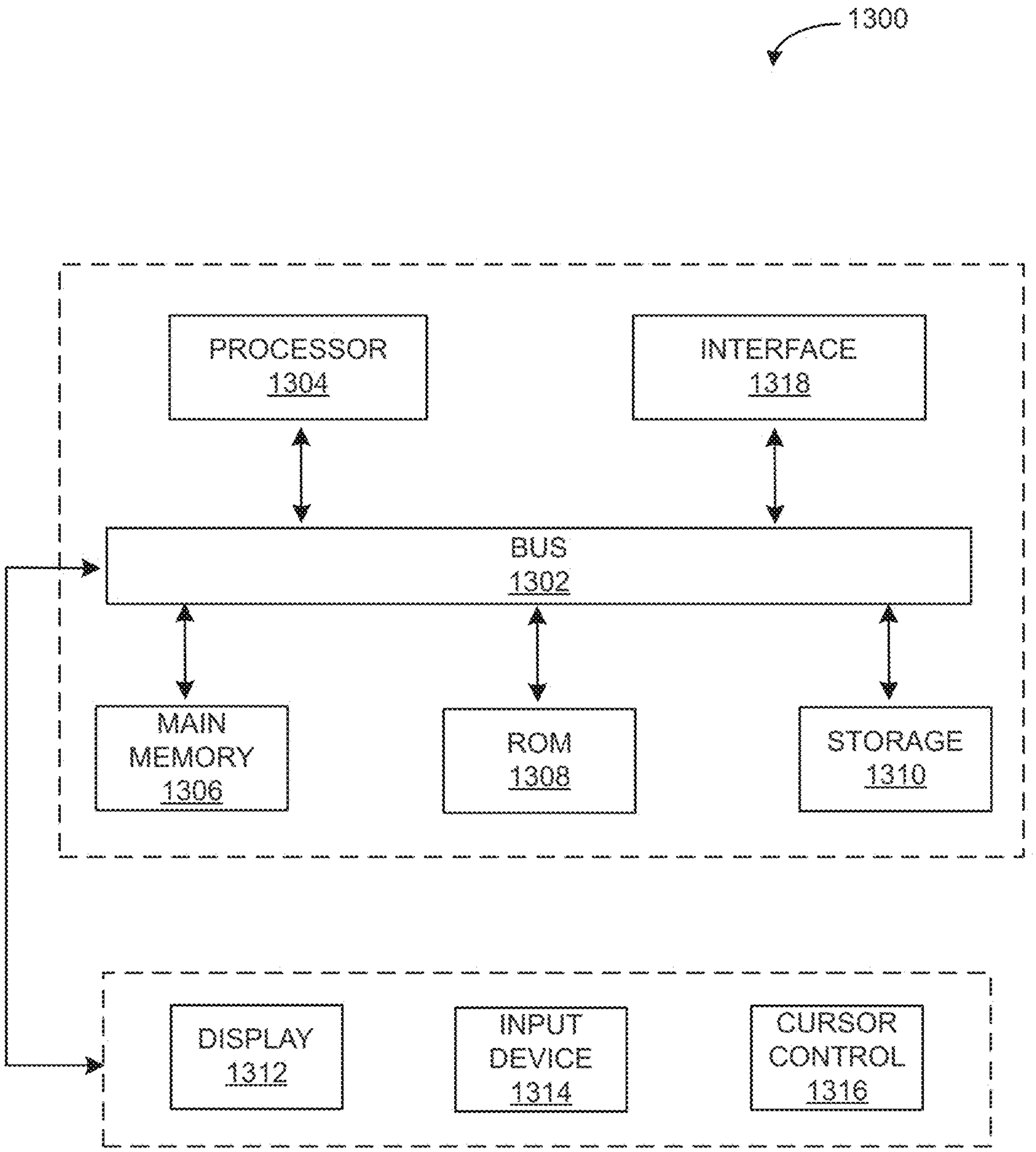
FIG. 13 is a computing component that may be used to implement examples of the disclosed technology.

FIG. 13 depicts a block diagram of an example computer system 1300 in which various examples of the disclosed technology described herein may be implemented. The computer system 1300 includes a bus 1302 or other communication mechanism for communicating information, one or more hardware processors 1304 coupled with bus 1302 for processing information. Hardware processor(s) 1304 may be, for example, one or more general purpose microprocessors.

The computer system 1300 also includes a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render computer system 1300 into a special-purpose machine that is customized to perform the operations specified in the instructions.

The computer system 1300 further includes a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

In general, the word “component,” “engine,” “system,” “database,” data store,” and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 1300 may implement the techniques described herein using customized hard-wired logic, one or more ASICs or FPGAs, firmware and/or program logic which in combination with the computer system causes or programs computer system 1300 to be a special-purpose machine. According to one example of the disclosed technology, the techniques herein are performed by computer system 1300 in response to processor(s) 1304 executing one or more sequences of one or more instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 1310. Volatile media includes dynamic memory, such as main memory 1306. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 1302. Transmission media can also take the form of acoustic or light waves, such as those generated during radio-wave and infra-red data communications.

The computer system 1300 also includes interface 1318 coupled to bus 1302. Interface 1318 provides a two-way data communication coupling to one or more network links that are connected to one or more local networks. For example, interface 1318 may be an integrated services digital network (ISDN) card, cable modem, satellite modem, or a modem to provide a data communication connection to a corresponding type of telephone line. As another example, interface 1318 may be a local area network (LAN) card to provide a data communication connection to a compatible LAN (or WAN component to communicate with a WAN). Wireless links may also be implemented. In any such implementation, interface 1318 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through interface 1318, which carry the digital data to and from computer system 1300, are example forms of transmission media.

The computer system 1300 can send messages and receive data, including program code, through the network(s), network link and interface 1318. In the Internet example, a server might transmit a requested code for an application program through the Internet, the ISP, the local network and interface 1318.

The received code may be executed by processor 1304 as it is received, and/or stored in storage device 1310, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed examples. The performance of certain of the operations or processes may be distributed among computer systems or computers processors, not only residing within a single machine, but deployed across a number of machines.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:

receiving, by a system comprising a memory-centered system architecture with fabric-attached memory based cluster of devices, operations data of a device in a data center, the operations data comprising operations conducted by the device associated with processor compute operations, memory operations, and input/output (I/O) operations;

determining a consumption ratio from the operations data with the processor compute operations as a ratio of the memory operations to the I/O operations during a time range;

generating a consumption variance tree data structure using the consumption ratio associated with the processor compute operations, the memory operations, and the I/O operations, wherein an agent of the device executes operations to measure out-of-bands operations, and the out-of-bands operations are added as nodes in the consumption variance tree data structure, wherein the consumption variance tree data structure records a pattern of the consumption ratio over the time range and a failure event of the device, and wherein the failure event is identified in the consumption variance tree data structure;

providing the consumption variance tree data structure for training a system characterization machine learning (ML) model, wherein the system characterization ML model is trained to detect operational events prior to a failure event of the device in the data center, and wherein the failure event of the device involves an adjustment to the consumption ratio associated with the operations conducted by the device; and implementing an inference process using the trained system characterization ML model, output from the trained system characterization ML model generating a failure prediction of other devices in the data center in association with the time range.

2. The computer-implemented method of claim 1, further comprising:

obtaining training hardware configuration information comprising an attribute value corresponding to a reference hardware type and load characteristics with failure and pre-failure events that has occurred with environmental characteristics affecting hardware components;

deriving the attribute value from the training hardware configuration information and the load characteristics annotated with the failure and pre-failure events, and the environmental characteristics;

training the system characterization ML model using the attribute value, wherein the system characterization ML model, when trained, generates a set of ranked augments for select nodes in the consumption variance tree data structure, wherein the set of ranked augments is implemented as an ordered directed acyclic graph comprising a plurality of nodes, each node of the plurality of nodes representing a specific ranked argument and multiple nodes of the plurality of nodes are connected by edges to form a first logical path to a terminating node, wherein the first logical path represents an increasing severity of ranked augments; and traversing the ordered directed acyclic graph to determine whether any node from the plurality of nodes corresponds to the specific ranked augment or adding a new root node of ranked augment where in the new root node is connected to an existing root node in parallel.

3. The computer-implemented method of claim 1, wherein the consumption variance tree data structure is augmented using a space partitioning process to define augmented nodes in the consumption variance tree data structure.

4. The computer-implemented method of claim 1, further comprising:

implementing a performance counter to append the operations data of the device; and generating the consumption ratio with the appended operations data and the performance counter.

5. The computer-implemented method of claim 1, further comprising:

receiving environmental data of the data center; and updating the consumption variance tree data structure with the environmental data.

6. The computer-implemented method of claim 1, wherein the pattern of the consumption ratio comprises multiple failure events during the time range, wherein the multiple failure events comprise transient failures and permanent failures.

7. The computer-implemented method of claim 1, further comprising:

updating the consumption variance tree data structure to include corrected failure events and permanent failure events.

8. The computer-implemented method of claim 1, wherein the processor compute operations comprise instruction dumps of the device.

9. The computer-implemented method of claim 1, wherein the processor compute operations, the memory operations, and the I/O operations are determined by processing offline analytics on instruction dumps.

10. The computer-implemented method of claim 9 wherein the instruction dumps are obtained from a processor core of a system being modeled, wherein the instruction dumps comprise dumping an instruction pointer to a shared memory through a logic gate circuitry custom chip block that interfaces with a micro-architectural block of a central processor unit (CPU).

11. The computer-implemented method of claim 1, wherein a memory-centered fabric comprises an interface DMA engine to store instructions in demarcated regions of a persistent memory.

12. The computer-implemented method of claim 1, wherein the consumption variance tree data structure is generated based on variances of compute, memory, and I/O over a configurable time distribution.

13. The computer-implemented method of claim 1, wherein the consumption variance tree data structure is annotated with user-defined indents that are dynamically defined in terms of size or characteristics.

14. The computer-implemented method of claim 1, wherein the consumption variance tree data structure comprises a total amount of time the processor compute operations comprise operations in an operational power state of the device compared to other power states.

15. The computer-implemented method of claim 1, wherein the failure event of the device is an internal fan failure, a temperature reading above a threshold value, a transient microcontroller-based voltage regulator module error, or a permanent microcontroller-based voltage regulator module error.

16. A computer system comprising:
a memory storing instructions; and
a processor communicatively coupled to the memory and configured to execute the instructions to:
receive operations data of a device in a data center, the operations data comprising operations conducted by the device associated with processor compute operations, memory operations, and input/output (I/O) operations;
determine a consumption ratio from the operations data with the processor compute operations as a ratio of the memory operations to the I/O operations during a time range, wherein the processor compute operations comprise instruction dumps of the device;
generate a consumption variance tree data structure using the consumption ratio associated with the processor compute operations, the memory operations, and the I/O operations, wherein the consumption variance tree data structure records a pattern of the consumption ratio over the time range and a failure event of the device, and wherein the failure event is identified in the consumption variance tree data structure;
provide the consumption variance tree data structure for training a system characterization machine learning (ML) model, wherein the system characterization ML model is trained to detect operational events prior to a failure event of the device in the data center, and wherein the failure event of the device involves an adjustment to the consumption ratio associated with the operations conducted by the device; and
implement an inference process using the trained system characterization ML model, output from the trained system characterization ML model generating a failure prediction of other devices in the data center in association with the time range.

17. The computer system of claim 16, wherein the processor is further configured to: obtain training hardware configuration information comprising an attribute value corresponding to a reference hardware type and load characteristics with failure and pre-failure events that has occurred with environmental characteristics affecting hardware components; derive the attribute value from the training hardware configuration information and the load characteristics annotated with the failure and pre-failure events, and the environmental characteristics; train the system characterization ML model using the attribute value, wherein the system characterization ML model, when trained, generates a set of ranked augments for select nodes in the consumption variance tree data structure, wherein the set of ranked augments is implemented as an ordered directed acyclic graph comprising a plurality of nodes, each node of the plurality of nodes representing a specific ranked argument and multiple nodes of the plurality of nodes are connected by edges to form a first logical path to a terminating node, wherein the first logical path represents an increasing severity of ranked augments; and traverse the ordered directed acyclic graph to determine whether any node from the plurality of nodes corresponds to the specified ranked augment or adding a new root node of ranked augment where in the new root node is connected to an existing root node in parallel.

18. The computer system of claim 16, wherein the consumption variance tree data structure is generated based on variances of compute, memory, and I/O over a configurable time distribution.

19. A non-transitory computer-readable storage medium storing a plurality of instructions executable by a processor, the plurality of instructions when executed by the processor cause the processor to:
receive operations data of a device in a data center, the operations data comprising operations conducted by the device associated with processor compute operations, memory operations, and input/output (I/O) operations, wherein the processor compute operations, the memory operations, and the I/O operations are determined by processing offline analytics on instruction dumps;
determine a consumption ratio from the operations data with the processor compute operations as a ratio of the memory operations to the I/O operations during a time range;
generate a consumption variance tree data structure using the consumption ratio associated with the processor compute operations, the memory operations, and the I/O operations, wherein the consumption variance tree data structure records a pattern of the consumption ratio over the time range and a failure event of the device, and wherein the failure event is identified in the consumption variance tree data structure;
provide the consumption variance tree data structure for training a system characterization machine learning (ML) model, wherein the system characterization ML model is trained to detect operational events prior to a failure event of the device in the data center, and wherein the failure event of the device involves an adjustment to the consumption ratio associated with the operations conducted by the device; and
implement an inference process using the trained system characterization ML model, output from the trained system characterization ML model generating a failure prediction of other devices in the data center in association with the time range.

20. The non-transitory computer-readable storage medium of claim 19, further comprising: obtain training hardware configuration information comprising an attribute value corresponding to a reference hardware type and load characteristics with failure and pre-failure events that has occurred with environmental characteristics affecting hardware components; derive the attribute value from the training hardware configuration information and the load characteristics annotated with the failure and pre-failure events, and the environmental characteristics; train the system characterization ML model using the attribute value, wherein the system characterization ML model, when trained, generates a set of ranked augments for select nodes in the consumption variance tree data structure, wherein the set of ranked augments is implemented as an ordered directed acyclic graph comprising a plurality of nodes, each node of the plurality of nodes representing a specific ranked argument and multiple nodes of the plurality of nodes are connected by edges to form a first logical path to a terminating node, wherein the first logical path represents an increasing severity of ranked augments; and traverse the ordered directed acyclic graph to determine whether any node from the plurality of nodes corresponds to the specified ranked augment or adding a new root node of ranked augment where in the new root node is connected to an existing root node in parallel.

* * * * *